United States Patent
Sliger

(10) Patent No.: US 9,880,734 B2
(45) Date of Patent: Jan. 30, 2018

(54) HANDWRITTEN INFORMATION INPUTTING DEVICE AND PORTABLE ELECTRONIC APPARATUS INCLUDING HANDWRITTEN INFORMATION INPUTTING DEVICE

(71) Applicant: Wacom Co., Ltd., Saitama (JP)

(72) Inventor: Joseph Sliger, Vancouver, WA (US)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 14/716,734

(22) Filed: May 19, 2015

(65) Prior Publication Data

US 2015/0253982 A1    Sep. 10, 2015

Related U.S. Application Data

(63) Continuation of application No. 13/554,840, filed on Jul. 20, 2012.

(30) Foreign Application Priority Data

Feb. 23, 2012  (JP) .................................. 2012-036910

(51) Int. Cl.
G06F 3/0488    (2013.01)
G06F 3/041     (2006.01)
(Continued)

(52) U.S. Cl.
CPC ...... *G06F 3/04883* (2013.01); *G06F 3/03545* (2013.01); *G06F 3/044* (2013.01);
(Continued)

(58) Field of Classification Search
CPC ... G06F 3/041–3/044; G06F 3/0484–3/04886; G06F 3/03545
See application file for complete search history.

(56) References Cited

U.S. PATENT DOCUMENTS 5,250,929 A * 10/1993 Hoffman ............... G06F 3/0488
                                                178/18.03
5,995,101 A * 11/1999 Clark ................... G06F 3/04895
                                                715/711

(Continued)

FOREIGN PATENT DOCUMENTS

JP        2009003796 A    1/2009
JP        2010088069 A    4/2010
(Continued)

OTHER PUBLICATIONS

Taiwanese Office Action dated Dec. 28, 2015, for corresponding TW Application No. 101129943, 12 pages.
(Continued)

*Primary Examiner* — David Tung
(74) *Attorney, Agent, or Firm* — Seed IP Law Group LLP

(57) ABSTRACT

A handwritten information inputting device includes an inputting region into which handwritten information is inputted with a pointer such as an electronic pen or a finger. The device also includes a function disposition region in which a plurality of operational elements (e.g., graphic icons) are disposed, each assigned a process related to the inputted handwritten information such as enlarging or rotating the inputted handwritten information. In response to a continuous operation for a defined period of time of any of the operational elements, operational element disposition information regarding the operational elements disposed in the function disposition region is displayed on an external display apparatus, to which the handwritten information inputting device is connected. Also, the operated (selected) operational element is displayed visually distinguishable from the rest of the operational elements. Thus, an operator can confirm his operation of the operational elements without taking his eyes off the external display apparatus.

18 Claims, 14 Drawing Sheets

(51) Int. Cl.
  *G06F 3/0354*   (2013.01)
  *G06F 3/046*    (2006.01)
  *G06F 3/044*    (2006.01)
  *G06F 3/0482*   (2013.01)
  *G06F 3/0484*   (2013.01)

(52) U.S. Cl.
  CPC ............ *G06F 3/046* (2013.01); *G06F 3/0412* (2013.01); *G06F 3/0414* (2013.01); *G06F 3/0416* (2013.01); *G06F 3/0482* (2013.01); *G06F 3/0484* (2013.01); *G06F 3/04886* (2013.01); *G06F 2203/0384* (2013.01); *G06F 2203/04104* (2013.01); *G06F 2203/04106* (2013.01); *G06F 2203/04808* (2013.01)

(56) References Cited

U.S. PATENT DOCUMENTS

| | | | |
|---|---|---|---|
| 6,337,698 B1* | 1/2002 | Keely, Jr. | G06F 3/0483 715/777 |
| 8,149,220 B2 | 4/2012 | Fukushima et al. | |
| 8,625,901 B2 | 1/2014 | Huang | |
| 2002/0130836 A1* | 9/2002 | Ohmori | G06F 1/1616 345/156 |
| 2003/0025678 A1* | 2/2003 | Lee | G06F 3/0488 345/173 |
| 2005/0024322 A1 | 2/2005 | Kupka | |
| 2005/0162411 A1* | 7/2005 | Berkel van | G06F 3/03545 345/179 |
| 2007/0146351 A1* | 6/2007 | Katsurahira | G06F 3/03545 345/179 |
| 2009/0160790 A1 | 6/2009 | Fukushima et al. | |
| 2010/0005390 A1 | 1/2010 | Bong | |
| 2010/0085208 A1 | 4/2010 | Murakoshi | |
| 2010/0271401 A1 | 10/2010 | Fong | |
| 2010/0321313 A1 | 12/2010 | Oda et al. | |
| 2010/0321314 A1 | 12/2010 | Oda et al. | |
| 2010/0321315 A1 | 12/2010 | Oda et al. | |
| 2010/0328261 A1* | 12/2010 | Woolley | G06F 3/0416 345/174 |
| 2011/0006759 A1 | 1/2011 | Fukushima | |
| 2011/0113374 A1 | 5/2011 | Sheehan et al. | |
| 2011/0123116 A1 | 5/2011 | Huang | |
| 2012/0019488 A1* | 1/2012 | McCarthy | G06F 3/03545 345/179 |
| 2012/0050183 A1* | 3/2012 | Lee | G06F 3/1423 345/173 |

FOREIGN PATENT DOCUMENTS

| | | |
|---|---|---|
| JP | 2011003035 A | 1/2011 |
| JP | 2011022661 A | 2/2011 |
| JP | 2 363 789 A2 | 9/2011 |
| TW | 201118657 A | 6/2011 |

OTHER PUBLICATIONS

Extended European Search Report, dated Oct. 6, 2014, for European Patent Application 12197990.0, 8 pages.

Summons to attend oral proceedings pursuant to Rule 115(1) EPC, dated Oct. 11, 2017, for European Application No. 12197990.0-1879/2631771, 10 pages.

* cited by examiner

FIG. 2
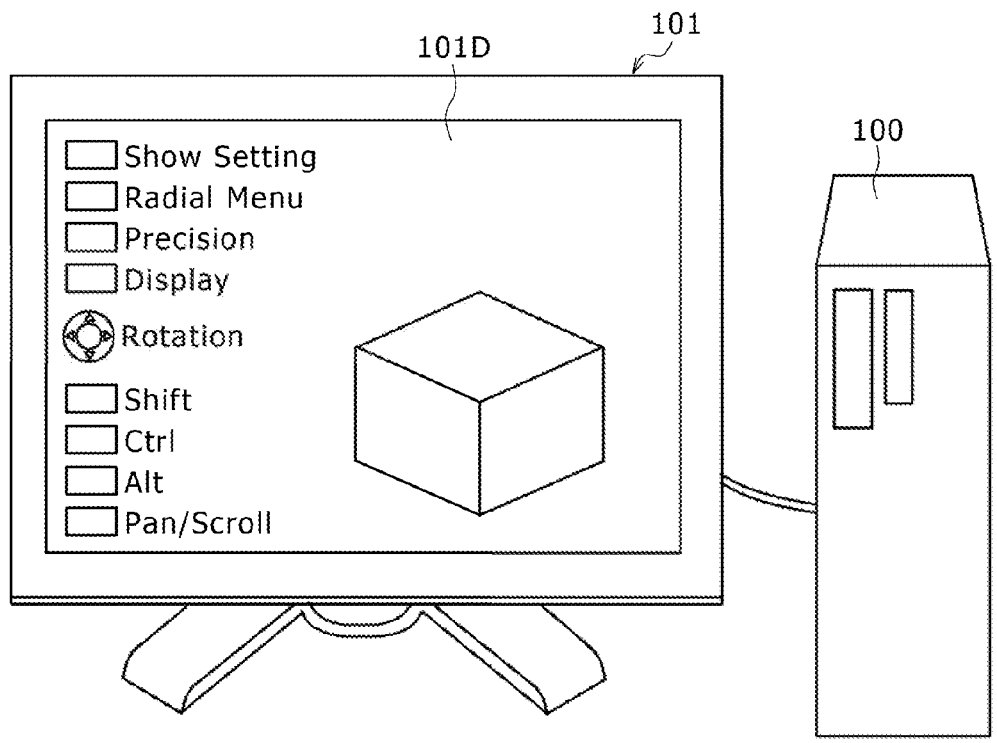
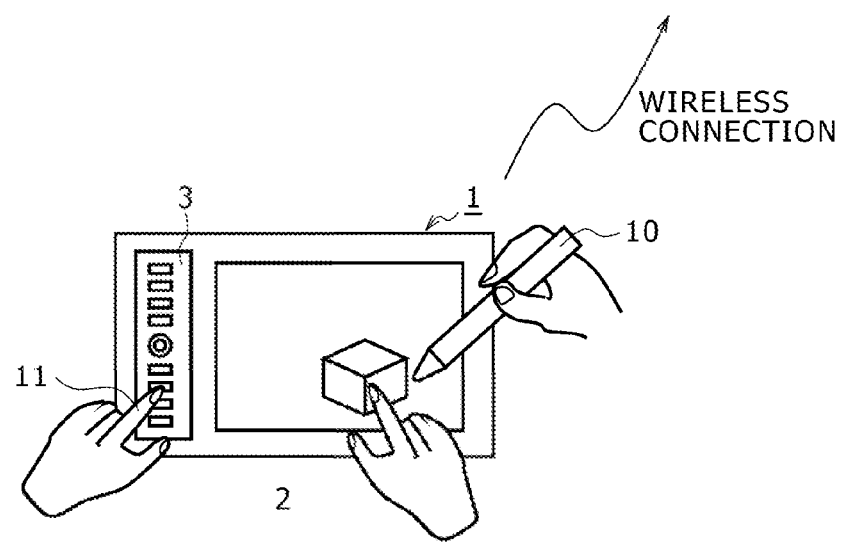

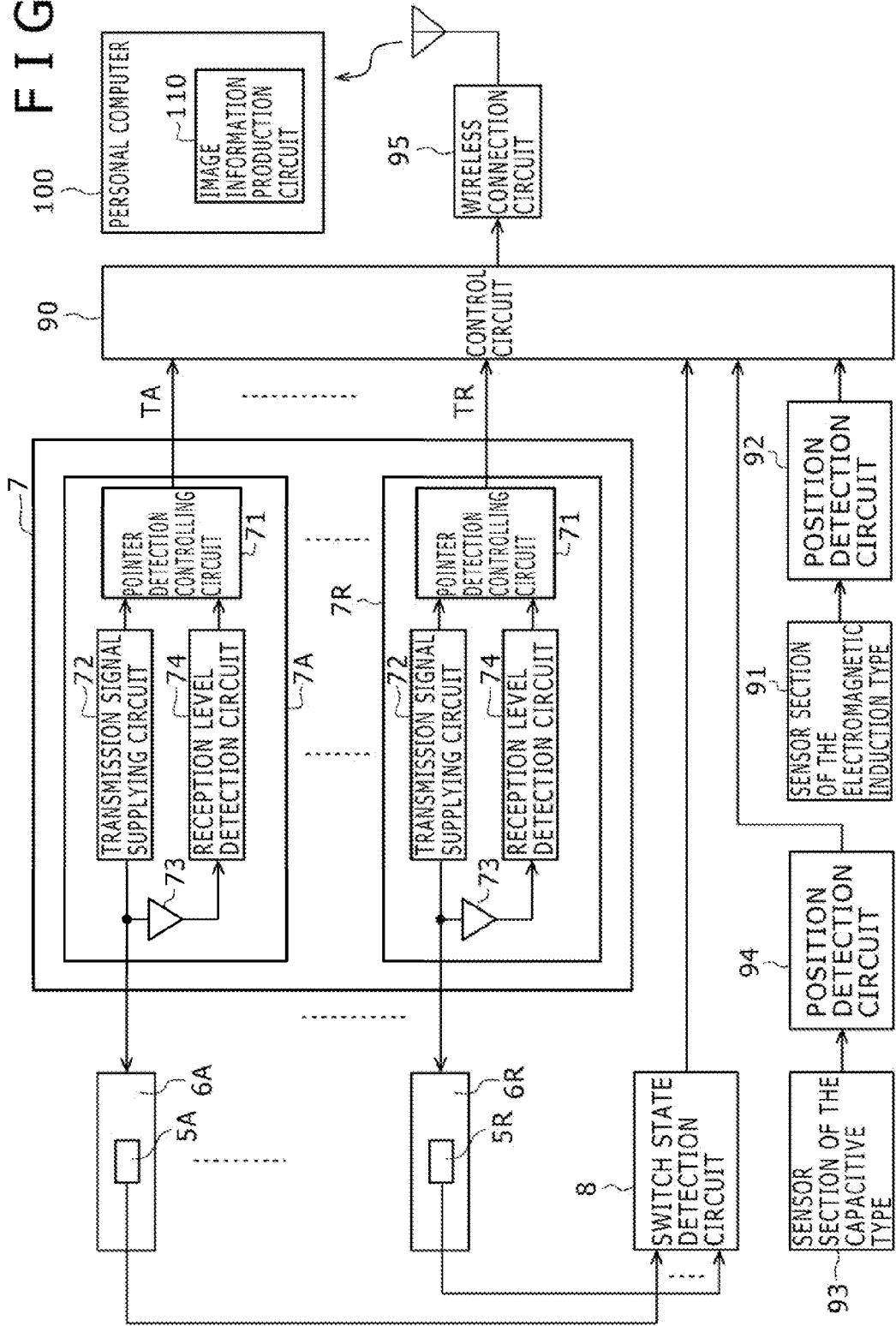

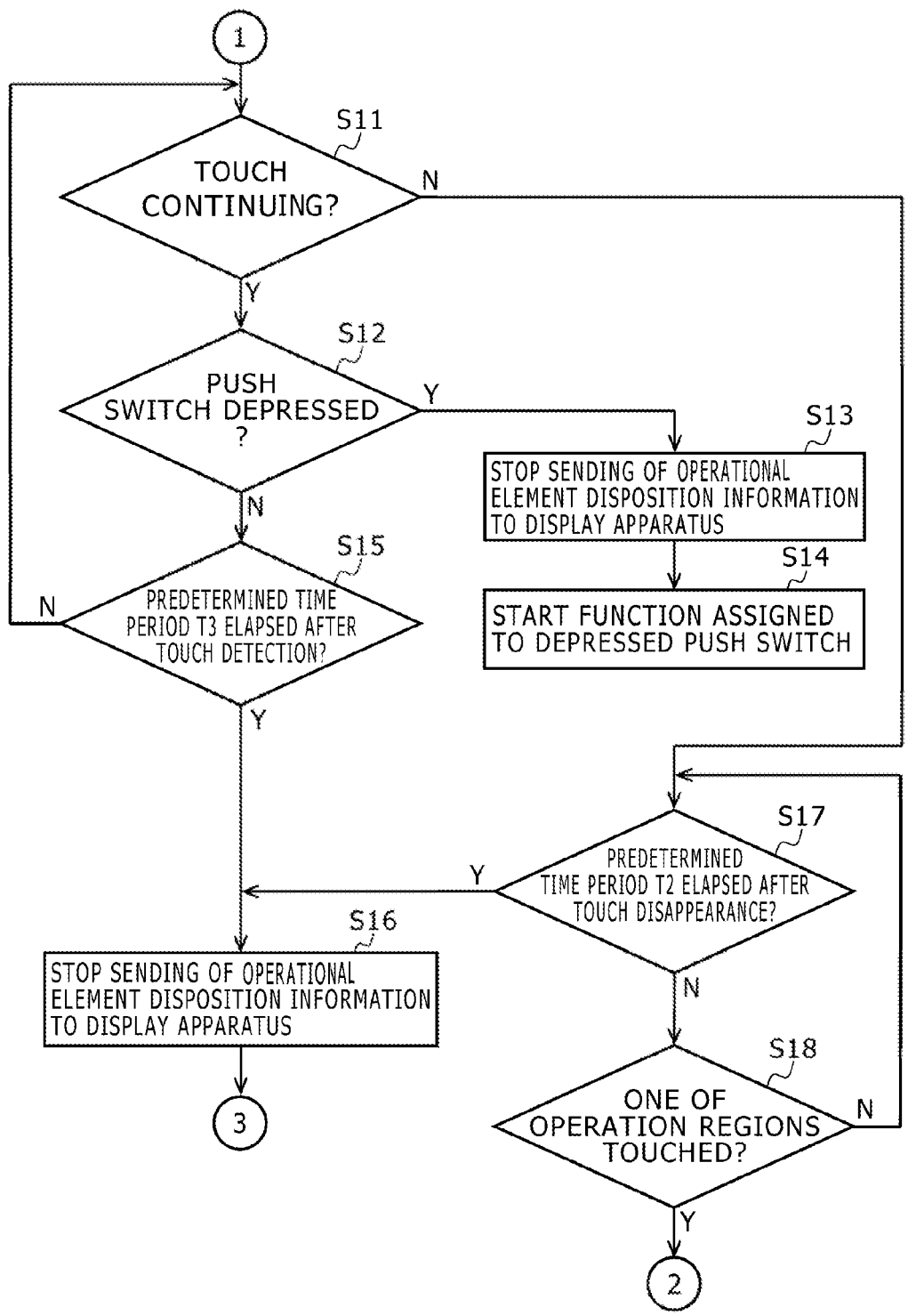

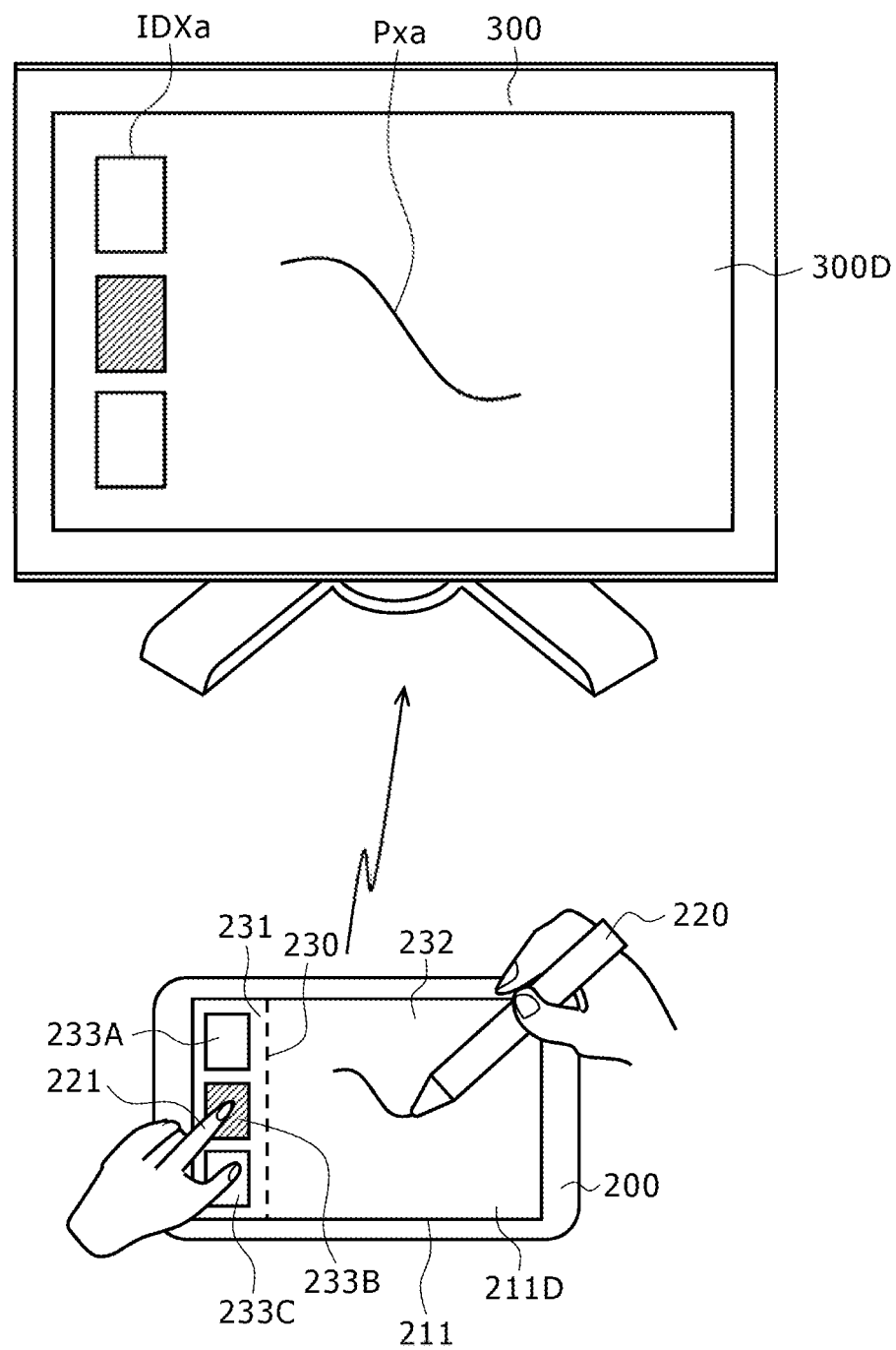

HANDWRITTEN INFORMATION INPUTTING DEVICE AND PORTABLE ELECTRONIC APPARATUS INCLUDING HANDWRITTEN INFORMATION INPUTTING DEVICE

CROSS-REFERENCE TO RELATED APPLICATION

The present application claims priority under 35 U.S.C. 119(a) of Japanese Application No. 2012-036910, filed Feb. 23, 2012, the entire content of which is incorporated herein by reference.

BACKGROUND

Technical Field

The present invention relates to a handwritten information inputting device including a plurality of operational elements, each of which is assigned a defined function related to a process for handwritten information. The invention also relates to such a handwritten information inputting device configured to be connected to an information processing device coupled to a display apparatus or an information processing device incorporating a display screen. The invention further relates to a portable electronic apparatus including such a handwritten information inputting device.

Description of the Related Art

As handwritten information inputting devices, digitizers and tablet devices are known. Generally, a handwritten information inputting device is a coordinate inputting device connected to and used with an information processing device equipped with a display screen, such as a computer connected to a display apparatus or a computer including a display screen, as disclosed in Patent Document 1 (Japanese Patent Laid-Open No. 2011-22661). In a handwritten information inputting device, when a pointing input operation is carried out on a position detection plane configured to detect two-dimensional position information of a position pointer, such as a pen-shaped pointer (hereinafter an "electronic pen"), a finger or the like, a position coordinate of the pointing input operation is detected and supplied to the information processing device. The information processing device generates, based on the position coordinate of the pointer's pointing input operation received from the handwritten information inputting device, image information corresponding to the handwritten input by the pointer and displays the image information on the screen of the display apparatus.

Some of the handwritten information inputting devices of the type described above include operational buttons or icons as operational elements for executing various processing functions, such as to move, rotate, expand/reduce, scroll, or change the display color of a handwritten or hand-drawn image displayed on a screen of a display apparatus.

Conventionally, in order to cause a handwritten information inputting device of the type described above to execute various processing functions described above, an operator of the handwritten information inputting device must shift his/her line of sight from a state in which the operator is staring at the screen of an external display apparatus of the handwritten information inputting device to the handwritten information inputting device itself, and confirm and operate an operational button of the handwritten information inputting device to initiate the function assigned to the operational button.

It is cumbersome, however, for the operator to have to shift his/her line of sight from the state in which the operator is staring at the screen of the external display apparatus to the handwritten information inputting device itself each time the operator of the handwritten information inputting device wishes to operate an operational button to initiate a defined processing function and, thus, the inputting operation described above is inefficient.

Patent Document 2 (Japanese Patent Laid-Open No. 2010-88069) discloses an electronic apparatus including a remote control transmission device and an electronic apparatus main body having a display screen. The remote control transmission device includes a touch sensor provided on the surface of an operation key of the remote control transmission device such that, when the touch sensor detects that the operation key is touched, the electronic apparatus main body displays characters or the like on the display screen corresponding to the function assigned to the touched operation key. Specifically, in Patent Document 2, when the touch sensor detects that the operation key is touched, the remote control transmission device immediately transmits a remote control signal to the electronic apparatus main body to indicate that the operation key is touched. When the electronic apparatus main body receives the remote control signal, it determines which one of the operation keys has been touched and recognizes a function assigned to the determined operation key, and then displays the function on the screen to alert the user.

PRIOR ART DOCUMENT

Patent Document

Patent Document 1
Japanese Patent Laid-Open No. 2011-22661
Patent Document 2
Japanese Patent Laid-Open No. 2010-88069

BRIEF SUMMARY

Problem(s) to be Solved by the Invention

Generally, when a plurality of operation keys are arrayed on a remote control transmission apparatus, an operator often memorizes the positions of the operation keys in the operation key array to search for and operate a desired operation key based on his memory. Specifically, if the operator is skilled in operating a particular apparatus whose operation key array is known to the operator, then the operator can perform typing without looking at the keys.

However, in the invention of Patent Document 2, only the text message (characters) indicating the processing function assigned to the operation key touched by the operator is displayed on the display screen, and the operation key array itself is not displayed on the display screen. In particular, in the case of the invention of Patent Document 2, if an operation key is touched, then a processing function assigned to the operation key is displayed, and therefore, even though the processing function assigned to the touched operation key can be verified on the screen, the position of the operation key within the key array cannot be visually determined.

Therefore, if the touched operation key is not an operation key of an intended processing function, since the operation key array is not displayed on the screen, there is no aide or clue to search for a desired operation key, and the operator is forced to touch other neighboring operation keys randomly to display processing functions assigned to the other operation keys. Alternatively, to avoid such random touching, the operator must move his line of sight from the display screen to the operation key array of the remote control transmission apparatus, search for the position of the desired operation key, touch the operation key and then move the line of sight back to the display screen to confirm a processing function assigned to the operation key on the screen. Therefore, with the invention of Patent Document 2 also, it is difficult to confirm and operate an operation key having a desired processing function while maintaining the sight on the display screen, and therefore the key operation may be inefficient.

Further, in the invention of Patent Document 2, since the operation keys are operation keys provided for the remote control transmission apparatus, whenever the user touches any of the operation keys, the text message indicating a processing function assigned to the touched operation key is immediately displayed on the display screen.

In contrast, in the case of a tablet device or the like, the processing function of an operational button is to assist an input of handwritten information. Therefore, preferably a processing function is displayed on the screen only when the user needs to view it, so as to avoid having the processing function display obstruct the display image of handwritten information. For example, when an operational button is touched in error or when the operator is skilled in operating the operational button array and has memorized the functions of individual operation keys, it is preferable not to display each function on the screen every time an operational button is touched.

According to one aspect of the present invention, a handwritten information inputting device is provided, which makes it possible for an operator to easily operate various operational elements without having to move his eyes off of the screen of an external display apparatus and, further, makes it possible for the operator to visually confirm, as occasion demands, an operational function of an operational element related to a process for handwritten information.

Means for Solving the Problem

In order to solve the problems described above, according to an aspect of the present invention, there is provided a handwritten information inputting device connected to an information processing device, to which a display apparatus is connected. The handwritten information inputting device includes:

a handwritten information inputting region, into which handwritten information corresponding to an operation of a pointer is to be inputted, and a function disposition region, in which a plurality of operational elements are disposed, wherein each operational element is assigned a process for handwritten information inputted by an operation of the pointer in the handwritten information inputting region;

wherein the handwritten information inputting device and the information processing device cooperate with each other such that, in response to a continuous operation for a defined period of time of any of the operational elements disposed in the function disposition region, operational element disposition information of the operational elements disposed in the function disposition region is displayed on the display apparatus to visually distinguish the operated operational element from the operational elements other than the operated operational element.

In the handwritten information inputting device according to the present invention having the configuration described above, if any of the plurality of operational elements assigned with the processes for handwritten information is operated continuously for the defined time period, then the operational element disposition information of the plurality of operational elements disposed in the function disposition region is displayed on the screen of the external display apparatus. Further, on the display screen, the operated operational element and the operational elements other than the operated operational element are displayed such that they can be visually distinguished from each other.

Accordingly, according to an aspect of the present invention, since the operational element disposition information of the plurality of operational elements disposed in the function disposition region are displayed on the display screen, the user can easily recognize from the display screen which one of the operational elements in the operational element array is the operated operational element and, furthermore, even if the operated operational element is not an operational element intended by the user, the user can readily recognize a desired operational element from the operational element disposition information without looking away from the display screen.

Accordingly, the user can recognize a desired operational element by looking only at an image displayed on the screen of the external display apparatus without moving the line of sight away from the display screen of the external display apparatus, and therefore can initiate a desired processing function necessary for his/her handwritten input.

Furthermore, according to an aspect of the present invention, only when it is detected that an operation of an operational element has continued for the defined time period, is the operational element disposition information regarding the plurality of operational elements displayed on the screen of the external display apparatus. This is because, if the operational element disposition information is displayed on the display screen in response to merely a brief or momentary operation of an operational element, then the operational element disposition information is unnecessarily displayed even when an operational element is inadvertently or erroneously operated. In contrast, according to an aspect of the present invention, it is possible to reflect the true intent of the operator with respect to the plurality of operational elements disposed in the function disposition region, with the operational element disposition information displayed on the display screen.

Therefore, even when the operational element disposition information is to be displayed over a relatively large display area, since the operational element disposition information is not unnecessarily displayed on the display screen, it is possible to avoid unnecessarily obstructing a main image of handwritten information displayed on the display screen.

Effects of the Invention

According to the present invention, a technical effect is achieved that a user can carry out an operation of an operational element for a process related to handwritten information without having to take his eyes off the display screen of the external display apparatus. Also, it becomes possible to avoid unnecessary obstruction of an image of handwritten information.

BRIEF DESCRIPTION OF THE SEVERAL VIEWS OF THE DRAWINGS

FIG. 2 is a view illustrating a sample use of an embodiment of the electronic apparatus according to the present invention.

FIG. 4 is a block diagram illustrating a sample configuration of a circuit section of an embodiment of the electronic apparatus according to the present invention.

FIGS. 5 and 6 each show a portion of a flow chart of a processing operation of an embodiment of the electronic apparatus according to the present invention.

FIG. 9 is a view illustrating a sample use of a different embodiment of the electronic apparatus according to the present invention.

DETAILED DESCRIPTION

First Embodiment

A first embodiment of a handwritten information inputting device according to the present invention is described as a tablet device, on which handwritten inputting can be carried out using a pointer such as an electronic pen or a finger for writing characters or drawing a picture.

Figure 1:
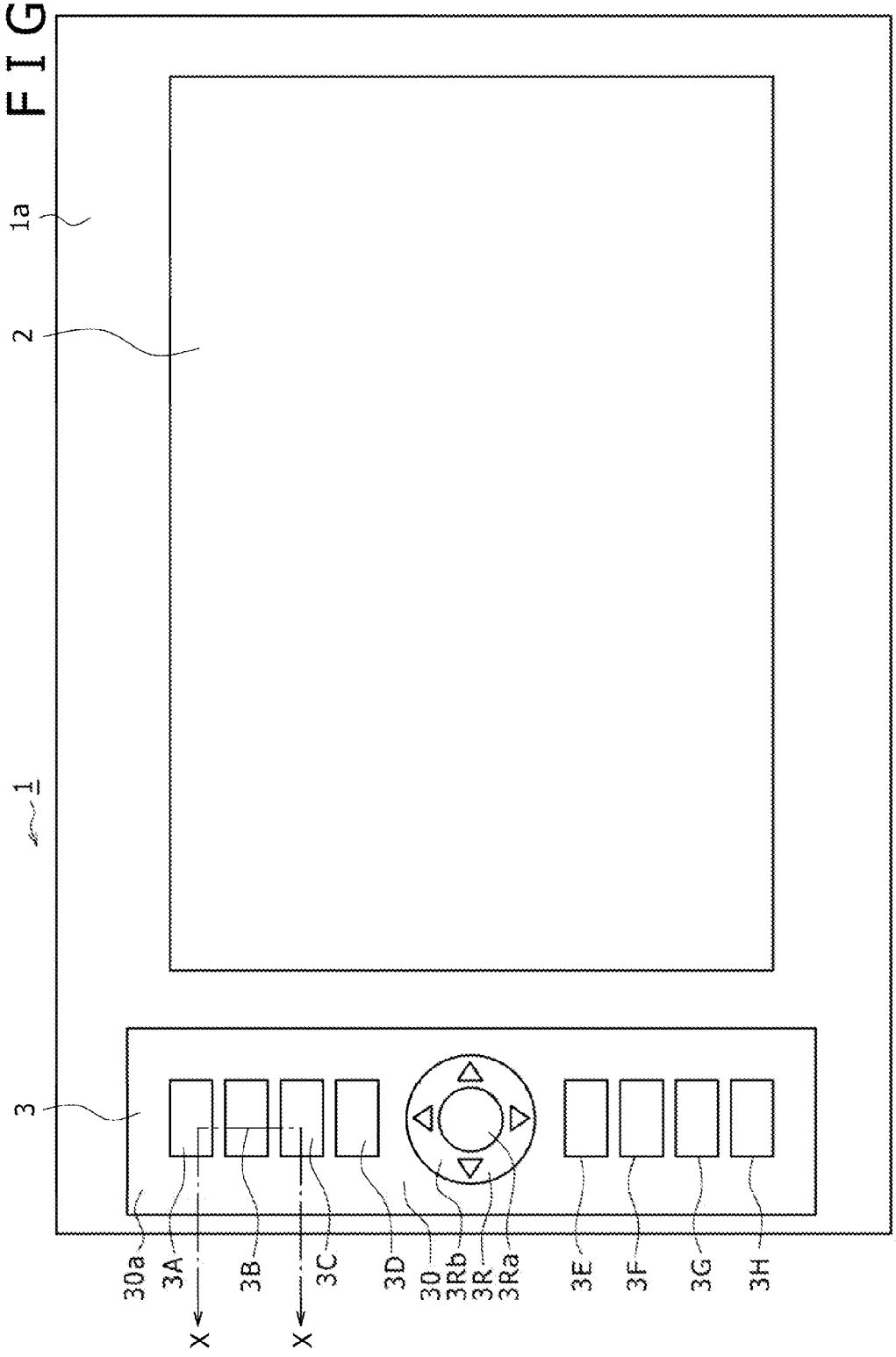
FIG. 1 is a view illustrating a sample configuration of an appearance of an embodiment of an electronic apparatus according to the present invention.

FIG. 1 is a view showing an appearance of a tablet device as an example of the handwritten information inputting device of the present embodiment. A housing of the tablet device 1 has an outer profile generally in the form of a thin plate and is configured from an upper case 1a and a lower case (not shown). FIG. 1 is a view of the upper case 1a as viewed from above. On the surface of the upper case 1a, a handwritten information inputting region 2 for detecting a handwritten operation input by an electronic pen (position pointer), which forms a pointer, and an operation switch section 3 are provided. The operation switch section 3 forms a function disposition region and has a plurality of operational elements arrayed thereon, as shown in the figure and as hereinafter described.

The tablet device 1 of the present example is connected to and used together with a personal computer 100 as an example of an information processing device connected to a display apparatus 101, as shown in FIG. 2. The personal computer 100 includes a program therein, for cooperating with the tablet device 1 to produce image information to be displayed on a display screen 101D of the display apparatus 101. In the example of FIG. 2, the tablet device 1 is connected by wireless connection to the personal computer 100 and is configured such that a character or a picture inputted with a pointer, such as an electronic pen or a finger, in the handwritten information inputting region 2 of the tablet device 1 is displayed on the display screen 101D of the display apparatus 101 connected to the personal computer 100.

For the wireless connection between the tablet device 1 and the personal computer 100, in the present example, the Bluetooth (registered trademark) standards technology is used. If a defined button (not shown) for wireless connection is operated, then the tablet device 1 searches for a personal computer 100 that is ready for wireless connection according to the Bluetooth standards and carries out, if such a personal computer 100 is located, a process (referred to as a "pairing process") for establishing a mutual connection to place both of them into a state in which they can communicate by wireless communication with each other. It is to be noted that the personal computer 100 determines whether the aspect ratio of the display screen 101D of the display apparatus 101 connected to the personal computer 100 is 4:3 or 16:9 based on information received from the display apparatus 101 and stored in the personal computer 100.

As hereinafter described, the personal computer 100 produces image information of a character or a picture drawn by a pointer, such as an electronic pen or a finger, based on information received from the tablet device 1 such that the aspect ratio is, for example, 4:3. Then, when the aspect ratio of the display screen 101D of the display apparatus 101 is 4:3, the personal computer 100 supplies the produced image information "as is" to the display apparatus 101. However, when the aspect ratio of the display screen 101D of the display apparatus 101 is 16:9, the personal computer 100 supplies the produced image information as image information in the format type of a pillar box (or a side panel) wherein dark frames are added to the left and right sides of an image of 4:3.

It is to be noted that the wireless connection between the tablet device 1 and the personal computer 100 is not limited to that according to the Bluetooth standards, and of course other technologies such as the WiFi (registered trademark: wireless fidelity) and other wireless connection methods can be used. Further, the tablet device 1 and the personal computer 100 may be configured such that they are connected by a wire connection by means of a cable. Further, the personal computer 100 and the display apparatus 101 may be connected to each other by wireless connection, and the personal computer 100 and the tablet device 1 may be configured as a single apparatus wherein they are integrally formed and accommodated in the same housing.

The tablet device 1 of the present example is configured such that, as shown in FIG. 2, in the handwritten information inputting region 2, position pointing by an electronic pen 10 can be detected and also position pointing by a finger 11 can be detected. To this end, though not shown, a sensor section of the electromagnetic induction type for detecting a pointing input by the electronic pen 10 and another sensor section of the capacitive type for detecting a pointing input by the finger 11 are provided in the housing below the handwritten information inputting region 2.

The configuration of the sensor section of the electromagnetic induction type is well known and disclosed, for example, in a patent document (Japanese Patent Laid-Open No. 2009-3796) and so forth, and therefore, detailed description of the same is omitted. Briefly, the sensor section includes a sensor substrate (not shown) having, for example, an X-axis direction loop coil group and a Y-axis direction loop coil group formed thereon, and sends an output signal corresponding to the (X, Y) coordinate position pointed to or operated on by the electronic pen 10.

Meanwhile, the configuration of the sensor section of the capacitive type is also well known and disclosed, for example, in another patent document (Japanese Patent Laid-Open No. 2011-3035), and therefore, detailed description of the same is omitted. Briefly, a conductor pattern of a matrix configuration is provided, wherein a plurality of conductors for signal transmission and a plurality of conductors for signal reception cross each other. The level of a reception signal is detected, which varies in response to a variation of the capacitance between a conductor for signal transmission and a conductor for signal reception, toward which a finger is approaching or touching. Based on the detected level of a reception signal, an output signal corresponding to the (X, Y) coordinate position pointed to by the finger is generated and outputted.

The sensor section of the capacitive type and the sensor section of the electromagnetic induction type are provided in a superposed relationship on each other in a direction perpendicular to the inputting face of the handwritten information inputting region 2. In this instance, normally the sensor section of the capacitive type is placed on the sensor section of the electromagnetic induction type, and the inputting face of the handwritten information inputting region 2 is disposed on the sensor section of the capacitive type.

In the tablet device 1 as the electronic apparatus of the first embodiment, the operation switch section 3 is provided laterally of the handwritten information inputting region 2 of the upper case 1a of the tablet device 1, as shown in FIGS. 1 and 2. In the present example, the operation switch section 3 includes a plurality of operation switches for carrying out operation control of auxiliary processing functions when a character or a picture is drawn by a pointer such as the electronic pen 10. In the present example, the operation switches are used as operational elements also to control the operation of the tablet device 1 itself. In the present example, nine operational elements including a circular operation region 3R disposed at a central portion of the operation switch section 3 are juxtaposed in a row in a vertical direction.

Referring to FIG. 1, in the present example, operation regions 3A, 3B, 3C, 3C, 3E, 3F, 3G, 3H and 3R that form the individual operational elements are disposed in the operation switch section 3. The operation regions 3A to 3H include quadrangular operation regions, and the operation region 3R includes a circular operation region. The operation switch section 3 has an operational element array wherein the circular operation region 3R is positioned at the center of the array in the vertical direction and the four operation regions 3A to 3D are successively juxtaposed above the circular operation region 3R while the four operation regions 3E to 3H are successively juxtaposed below the circular operation region 3R.

The present embodiment is configured such that, as hereinafter described, if a user touches any of the operation regions 3A to 3H and 3R with the finger 11, then the touch can be detected by the capacitive type method. Further, the operation regions 3A to 3H and 3R are each configured such that, if the user presses the same with the finger 11, then a push switch provided on an operation switch circuit board disposed in the housing is depressed as the operation region (thereabove) is deflected in an inward direction into the housing of the tablet device 1, to thereby carry out a switch operation. The push switches and the operation regions 3A to 3H and 3R together form operational elements.

It is to be noted that the circular operation region 3R is configured from a central operation region 3Ra, and a ring-shaped touch wheel operation region 3Rb positioned around the central operation region 3Ra. The push switch provided relative to the circular operation region 3R is provided not only beneath the central operation region 3Ra but also beneath the touch wheel operation region 3Rb at upper, lower, left and right positions of the touch wheel operation region 3Rb, indicated by triangular marks in FIG. 1. In the present example, to detect a tracing operation on or over the touch wheel operation region 3Rb in a circumferential direction, though not shown, a rotational position detection sensor for detecting a rotating operation is further provided beneath the touch wheel operation region 3Rb.

The operation switch section 3 is constructed of an operation plate section 30 formed as a part separate from the upper case 1a, and an operation switch circuit board (hereinafter referred to simply as circuit board) provided in the housing of the tablet device 1 on the lower face side of (beneath) the operation plate section 30. The operation regions 3A to 3H and 3R are provided on the operation plate section 30. The operation regions 3A to 3H and 3R are configured similarly to each other except that the operation region 3R is different from the operation regions 3A to 3H in that it has a circular shape. Therefore, in the following description, a sample configuration of the operation region 3B is described as an example of an operational element.

Figure 3A:
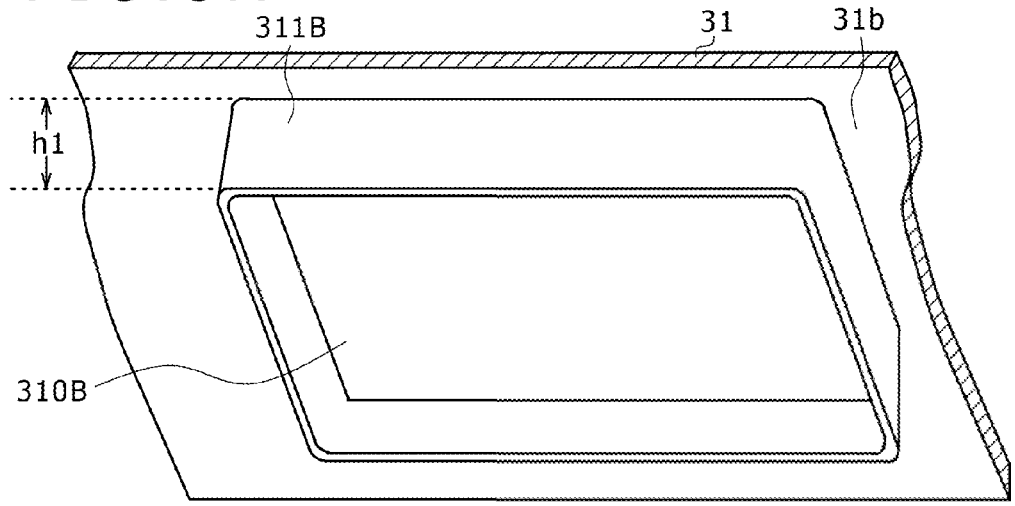
FIGS. 3A to 3C are views each illustrating a sample configuration of an operational element in an embodiment of the electronic apparatus according to the present invention.
Figure 3B:
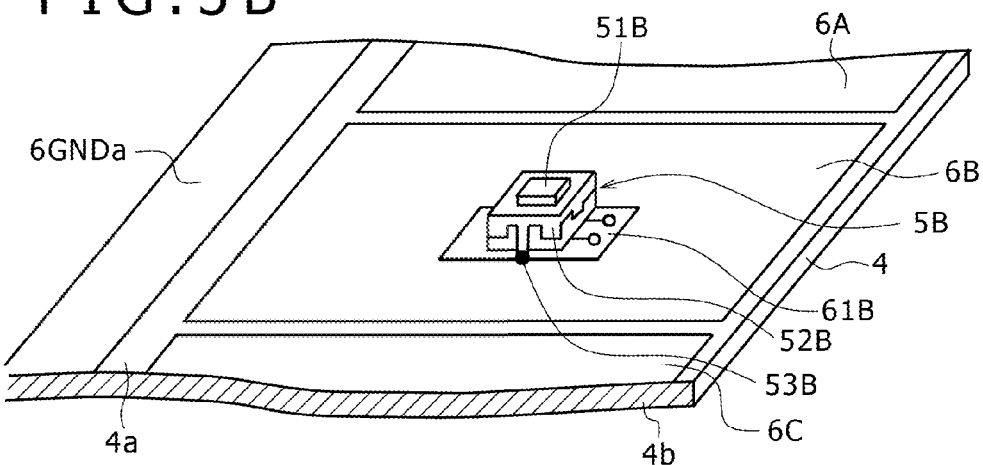
Figure 3C:
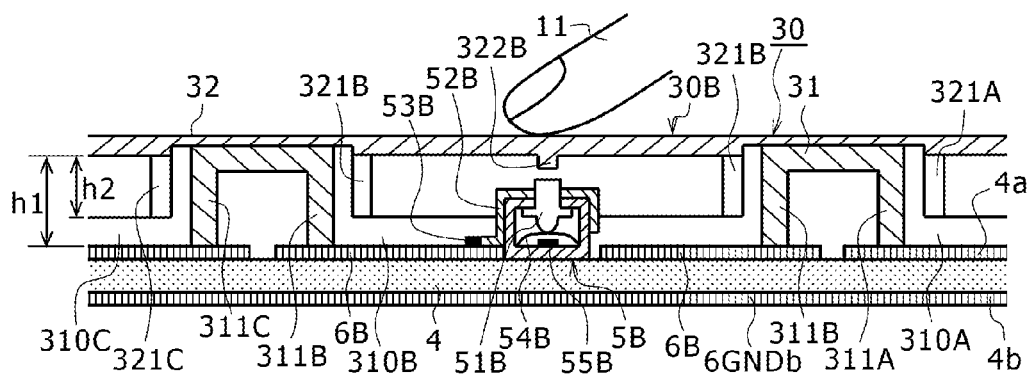

FIGS. 3A to 3C are views illustrating a sample configuration of the operation region 3B as a sample operational element. FIG. 3A shows a portion of the operation plate section 30 of the operation region 3B as viewed from within the housing, FIG. 3B shows the circuit board on the lower side of the operation region 3B, and FIG. 3C is a cross-sectional view taken along line X-X of FIG. 1.

The operation plate section 30 is formed, for example, from resin, and configured from a plate-like member 31, as shown in FIG. 3A. A protective sheet member 32 (see FIG. 3C) is provided, to cover the surface 30a side (see FIG. 1) and side portions of the operation plate section 30 of the plate-like member 31.

As shown in FIGS. 3B and 3C, a touch detection electrode 6B that forms the sensor section of the capacitive type is disposed as a conductor pattern printed on a face 4a of a circuit board 4 that is facing the operation region 3B, so as to correspond and oppose to the operation region 3B of the operation plate section 30.

The touch detection electrode 6B is formed as a conductor pattern spaced from and above the circuit board 4 such that it does not electrically connect to other adjacent touch detection electrodes 6A and 6C. Further, the touch detection electrode 6B is connected, via a through-hole (not shown) to a conductor pattern formed on a face 4b of the circuit board 4 opposite to the face 4a thereof, to a touch detection circuit (IC (Integrated Circuit)) of the capacitive type, as will be described below.

At a substantially central position of the touch detection electrode 6B of the circuit board 4, a region 61B having no conductor pattern is provided, and a push switch 5B is disposed in the region 61B. The push switch 5B includes a movable portion 51B exposed to the outside and movable in response to depression thereof, as seen in FIGS. 3B and 3C. The push switch 5B changes its switch state when the movable portion 51B is depressed.

The push switch 5B in the present embodiment includes a metal frame 52B at an outermost peripheral portion thereof, and in order to utilize this metal frame 52B also as part of the touch detection electrode 6B, the ground terminal 53B of the push switch 5B is soldered not to a grounding conductor but to the touch detection electrode 6B, to thereby establish an electric connection.

In this instance, switch terminals of the push switch 5B are electrically connected, by soldering, to wiring lines (not shown) disposed on the circuit board 4 in this region 61B. On the face 4b side of the circuit board 4, a switch state detection circuit (IC) for detecting an on/off state of the push switch 5B is provided, and the push switch 5B is connected to the switch state detection circuit through the wiring lines described above.

In the present example, as the push switch 5B, a switch (push switch) of the product number EVPAA102K by Panasonic Electronic Devices Co., Ltd. is used as an electronic part (finished part), for example. This push switch is small in size in that the outer size thereof is length×width× height=3.5 mm×2.9 mm×1.7 mm.

It is to be noted that, on the face 4a of the circuit board 4, a ground electrode 6GNDa formed from a conductor pattern is disposed so as to surround a plurality of touch detection electrodes including the touch detection electrode 6B, such that touch detection by the touch detection electrode 6B can be carried out more stably based on the ground electrode 6GNDa. It is to be further noted that, on the face 4b of the circuit board 4, a ground electrode 6GNDb (see FIG. 3C) formed from a conductor pattern is disposed substantially over the entire area in the present example.

Meanwhile, in the plate-like member 31, a through-hole 310B of a size corresponding to the operation region 3B is formed. In FIG. 3C, through-holes 310A and 310C corresponding to the operation regions 3A and 3C are shown.

The protective sheet member 32 is bonded to the upper face of the plate-like member 31 by a bonding agent so as to cover the through-holes 310A, 310B, 310C, and so on. The protective sheet member 32 is, in the present example, a dielectric elastic material having a dielectric constant higher than those of the air and the plate-like member 31. The protective sheet member 32 is formed from a sheet member made of, for example, dielectric rubber.

Accordingly, in the operation plate section 30, the region in which the through-hole 310B of the plate-like member 31 is formed, that is, the operation region 3B, exhibits a state in which only the protective sheet member 32 exists. Therefore, if the user pushes the operation region 3B with the finger 11 from the surface 30a side of the operation plate section 30, then the protective sheet member 32 is biased to be deflected to the inner side of the housing of the tablet device 1 through the through-hole 310B of the plate-like member 31.

In this instance, as shown in FIG. 3C, an annular (surrounding) rib 311B of a defined height h1 (see also FIG. 3A) is formed in an implanted manner on a circumferential portion of the through-hole 310B on the rear face 31b side (see FIG. 3A) of the plate-like member 31. This annular rib 311B has a role of separating the operation region 3B from the operation region 3A or the operation region 3C disposed adjacent thereto, and another role of a spacer for spacing the circuit board 4 and the operation plate section 30 from each other by the height h1. FIG. 3C also shows annular ribs 311A and 311C, which are formed in an implanted manner on circumferential portions of the through-holes 310A and 310C of the operation regions 3A and 3C positioned adjacent to the operation region 3B.

It is to be noted that, in the present example, at a portion of the protective sheet member 32 formed of a dielectric elastic material corresponding to the through-hole 310B of the plate-like member 31, a rib 321B is formed, for example, along a contour shape of the operation region 3B. The height h2 of this rib 321B is lower than the height h1 of the annular rib 311B formed on the rear face side of the plate-like member 31, as in h1>h2.

Since the distance between the protective sheet member 32 formed from a dielectric elastic material and the touch detection electrode 6B is essentially maintained short due to the presence of the rib 321B, the thickness of the air layer between the peripheral portion of the push switch 5B and the touch detection electrode 6B is reduced and the dielectric constant of the operation region 3B becomes greater than the dielectric constant of other region(s) of the operation plate section 30. Consequently, the capacitance between the touch detection electrode 6B and the finger 11 of the user that is touching the operation region 3B can be increased, and the detection sensitivity of a touching operation can be improved. It is to be noted that, FIG. 3C also shows ribs 321A and 321C formed on the protective sheet member 32 in the operation regions 3A and 3C positioned adjacent to the operation region 3B.

At the center of the rib 321B formed on the protective sheet member 32, a protrusion 322B is formed for surely pressing the movable portion 51B of the push switch 5B.

In the present embodiment, the operation plate section 30 is positioned and disposed in a superposed relationship on the circuit board 4 such that the centers of the operation regions 3A to 3H and 3R correspond to the positions of the centers of the touch detection electrodes 6A to 6H and 6R of the circuit board 4, respectively, and the operation plate section 30 and the circuit board 4 are coupled to each other to form the operation switch section 3.

As shown in FIG. 3C, when the finger 11 of the user is in a state in which it lightly touches the surface of the protective sheet member 32 of the operation region 3B, the movable portion 51B of the push switch 5B is in a state in which it is not depressed. However, at this time, it is detected by the touch detection circuit 7 as shown in FIG. 4, to which the touch detection electrodes (6A to 6R) are connected, that the finger 11 is touching the operation region 30B. In FIG. 3C, since the metal frame 52B of the push switch 5B is connected to the touch detection electrode 6B through the ground terminal 53B, this portion of the metal frame 52B functions as part of an electrode for detecting a touch of the finger 11. Accordingly, if the operation region 30B is touched by the finger 11, then the touch can be detected with a high sensitivity.

If a user presses the operation region 3B with the finger 11 in the state of FIG. 3C, then the protective sheet member 32 made of dielectric rubber as a dielectric elastic material is deflected to depress the movable portion 51B of the push switch 5B. Consequently, in the push switch 5B, a dome-shaped electrode 54B forming the switch is deflected downwardly by the movable portion 51B to establish a state in which it is connected to the other electrode 55B of the switch. If, in this state, the pressing force by the finger 11 is removed, then the dome-shaped electrode 54B of the switch is restored to its original state to undo the connection to the other electrode 55B.

In the present embodiment, if the operation region 3B is touched by the finger 11, then the touch is detected by the touch detection electrode 6B as described above. Then, if the operation region 3B is pressed continuously by the finger 11, then the switch state of the push switch 5B is changed, and the depression operation is detected. A touching operation and a depression operation of the finger 11 can be detected similarly with regard to the other operation regions 3A, 3C to 3H and 3R, also.

In the tablet device 1 of the present embodiment, depression operations of the operation regions 3A to 3H and 3R are assigned with various functions related to pointing input by a pointer to the handwritten information inputting region 2. The user can select functions he or she wishes to use from among many functions, and then assign each the selected functions to a depression operation of any of the operation regions 3A to 3H and 3R. The assignment of the functions to the depression operations of the operation regions 3A to 3H and 3R can be carried out in advance.

The functions assignable to the depression operations of the operation regions 3A to 3H and 3R may include, for example, displaying a set menu, switching between various modes, returning to the immediately preceding step, and enlargement, reduction, movement, rotation, scroll and so forth of a character or a picture displayed on the screen.

As described hereinabove, if the user carries out position pointing input operation by means of a pointer such as the finger 11 or the electronic pen 10 in the handwritten information inputting region 2, then the tablet device 1 of the present embodiment detects the pointed input position and sends the detected coordinate to the personal computer 100. The personal computer 100 produces image information corresponding to handwritten input information based on the detected coordinate received from the tablet device 1 and displays the produced image information on the display screen 101D of the display apparatus 101.

Accordingly, the user can carry out desired drawing input by operating a pointer in the handwritten information inputting region 2 of the tablet device 1 while watching the image displayed on the display screen 101D of the display apparatus 101. Further, according to an aspect of the present invention, whichever one of the operation regions 3A to 3H and 3R that form the function disposition region is operated, desired functions assigned to depression operations of the operation regions 3A to 3H and 3R can be displayed on the display screen 101D of the display apparatus 101. Therefore, the user can confirm contents of a process to be executed by a desired depression operation without having to move his line of sight from the display screen 101D of the display apparatus 101.

FIG. 4 shows an example of an internal circuit configuration of the tablet device 1 as the electronic apparatus of the first embodiment. As shown in FIG. 4, the tablet device 1 of the present embodiment includes a touch detection circuit 7, a switch state detection circuit 8 for detecting a depression state of a push switch, a sensor section 91 of the electromagnetic induction type, a position detection circuit 92 for detecting a position pointing input by the electronic pen 10 as a pointer to the sensor section 91 of the electromagnetic induction type, a sensor section 93 of the capacitive type, a position detection circuit 94 for detecting a position pointing input by the finger 11 as a pointer to the sensor section 93 of the capacitive type, a wireless connection circuit 95 for wirelessly connecting to an information processing device such as the personal computer 100, and a control circuit 90. To the control circuit 90, the touch detection circuit 7, switch state detection circuit 8, position detection circuits 92 and 94 and wireless connection circuit 95 are connected.

As described above, the wireless connection circuit 95 in the present embodiment is a circuit for establishing a wireless connection, for example, in accordance with the Bluetooth standards to an information processing device such as the personal computer 100. In response to an operation of a button (not shown), the control circuit 90 controls the wireless connection circuit 95 to carry out a search for an apparatus available for wireless connection in accordance with the Bluetooth standards. Then, if an information processing device available for wireless connection is detected, the wireless connection circuit 95 carries out wireless connection to the information processing device.

The sensor section 91 of the electromagnetic induction type detects a pointing input by the electronic pen 10. Then, the pointing input by the electronic pen 10 detected by the sensor section 91 is supplied to the position detection circuit 92, which detects a coordinate value of the pointed position. Then, the position detection circuit 92 supplies the detected coordinate value to the control circuit 90. The control circuit 90 transmits the received coordinate value to the personal computer 100 connected by wireless connection through the wireless connection circuit 95.

Meanwhile, the sensor section 93 of the capacitive type detects a pointing input by the finger 11. Then, the pointing input by the finger 11 detected by the sensor section 93 is supplied to the position detection circuit 94, which detects the coordinate value of the pointed position. Then, the position detection circuit 94 supplies the detected coordinate value to the control circuit 90. The control circuit 90 transmits the received coordinate value to the personal computer 100 through the wireless connection circuit 95.

The personal computer 100 includes an image information production circuit 110 as a functional element implemented by software, for example. The image information production circuit 110 produces an image of a locus or the like in response to a pointing input by a pointer such as the electronic pen 10 or the finger 11, based on a coordinate value and information of time at which the coordinate value is received. In this instance, the personal computer 100 determines an aspect ratio of the display apparatus 101 through communication with the display apparatus 101, and stores the aspect ratio in advance. Then, the personal computer 100 causes the image information production circuit 110 to produce an image of a locus or the like, in response to the pointing input by the pointer such as the electronic pen 10, in the aspect ratio of 4:3, for example, in accordance with a corresponding image display standard.

Then, the personal computer 100 supplies the produced image information to the display apparatus 101 so that the image information is displayed on the display screen 101D.

The touch detection circuit 7 includes touch detection circuit sections 7A to 7H and 7R (hereinafter referred to as touch detection circuit sections 7A to 7R) for detecting a touch of the finger 11 with the operation regions 3A to 3H and 3R corresponding to the touch detection electrodes 6A to 6H and 6R, respectively, as part of the capacitive type sensor. The touch detection circuit sections 7A to 7R all have the same configuration and include a pointer detection controlling circuit 71, a transmission signal supplying circuit 72, a reception amplifier 73 and a reception level detection circuit 74.

In each of the touch detection circuit sections 7A to 7R, the transmission signal supplying circuit 72 outputs a transmission signal, for example, in the form of an ac signal of a defined frequency in accordance with a control instruction of the pointer detection controlling circuit 71. Such transmission signals are supplied to the touch detection electrodes 6A to 6R. Further, the transmission signals are inputted to the reception level detection circuit 74 through the respective reception amplifiers 73.

With respect to each of the operation regions 3A to 3R, if the finger 11 of the user does not touch the same, then the input signal to the reception level detection circuit 74 is a signal of a defined level En corresponding to the signal level of the transmission signal, and the reception level detection circuit 74 detects the defined level En and outputs the same to the pointer detection controlling circuit 71.

On the other hand, with respect to any of the operation regions 3A to 3R, if the finger 11 of the user touches the same, then part of the transmission signal supplied to a corresponding one of the touch detection electrodes 6A to 6R flows to the ground through the human body via a capacitor formed between the finger 11 and the touch detection electrode (6A to 6R) touched by the finger 11. Therefore, if the finger 11 touches a touch electrode, then the level of the input signal to the reception level detection circuit 74 varies to a low level Es as compared to that when the finger 11 does not touch the electrode. Accordingly, the reception level detection circuit 74 detects the signal variation to the low level Es and outputs the same to the pointer detection controlling circuit 71.

The pointer detection controlling circuit 71 compares the level output from the reception level detection circuit 74 with a threshold level Eth (En>Eth>Es) determined in advance and detects, when the level output from the reception level detection circuit 74 is lower than the threshold level Eth, that the finger 11 of the user is touching the operation region (3A to 3R). Otherwise, the pointer detection controlling circuit 71 detects that the finger 11 is not touching an operation region and outputs the detection result.

Each of the touch detection circuit sections 7A to 7R outputs the detection output of the pointer detection controlling circuit 71 as a touch detection output TA to TR, related to a corresponding one of the operation regions 3A to 3R, to the control circuit 90.

It is to be noted that, where transmission signals from the transmission signal supplying circuits 72 of the touch detection circuit sections 7A to 7R are signals of the same frequency, the transmission signals from the transmission signal supplying circuits 72 are supplied time-divisionally so that the output timings of the transmission signals from the transmission signal supplying circuits 72 of the touch detection circuit sections 7A to 7R do not overlap with each other. On the other hand, it is also possible to supply the transmission signals from the transmission signal supplying circuit 72 of the touch detection circuit sections 7A to 7R at the same time by forming the transmission signals from the transmission signal supplying circuits 72 of the touch detection circuit sections 7A to 7R as signals of different frequencies or as signals of different codes.

Further, switch output signals of the push switches 5A to 5R disposed on the circuit board 4 are supplied to the switch state detection circuit 8. When one of the push switches 5A to 5R is depressed by the finger 11 to change the switch state, the switch state detection circuit 8 supplies information identifying the depressed push switch to the control circuit 90. Also, when a plurality of the push switches 5A to 5R are depressed simultaneously, the switch state detection circuit 8 can detect which ones of the push switches are depressed simultaneously.

The control circuit 90 transmits touch detection outputs TA to TR received from the touch detection circuit 7 and information identifying a depressed push switch received from the switch state detection circuit 8 to the personal computer 100 through the wireless connection circuit 95.

Figure 5:
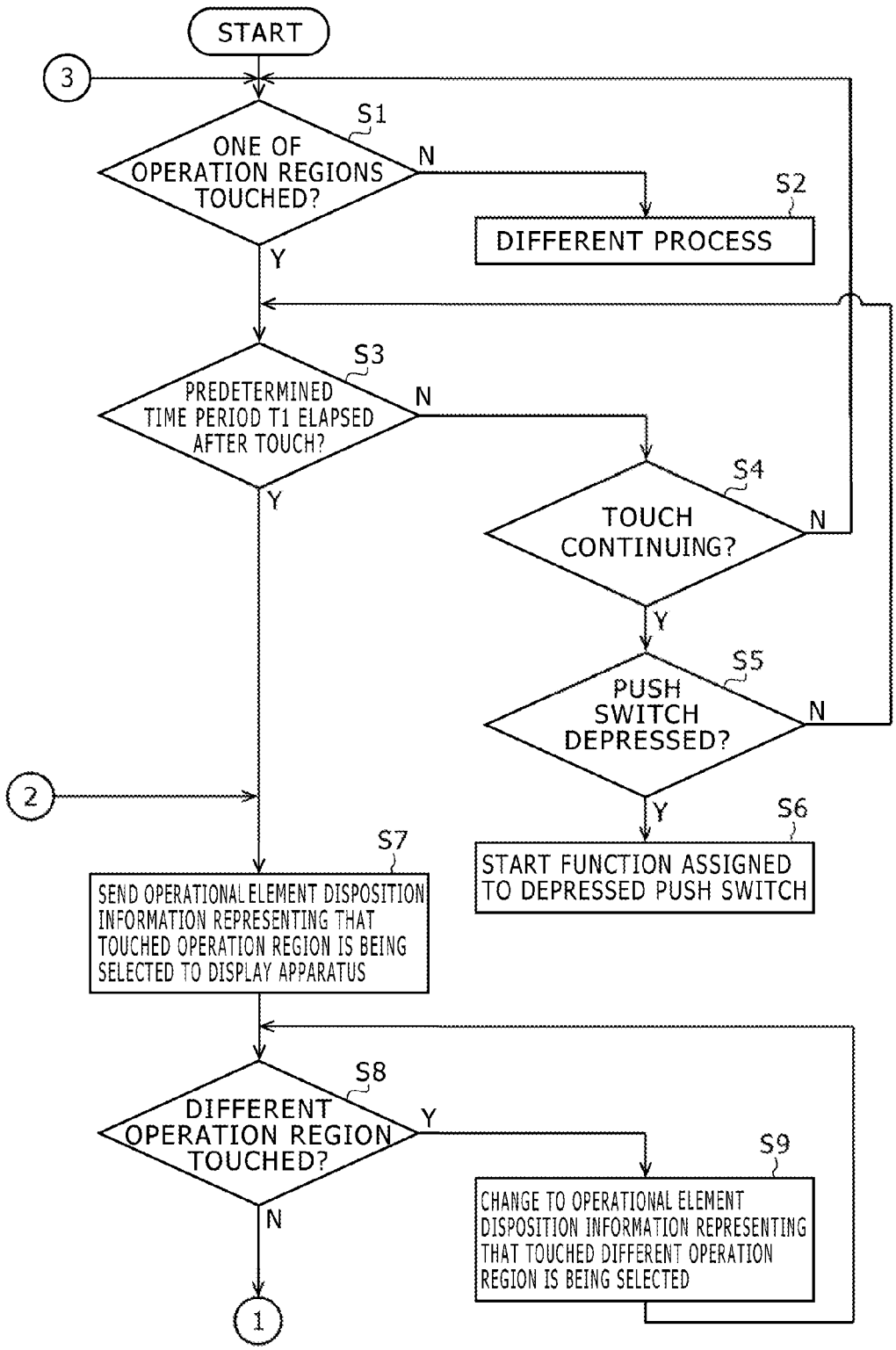

When the personal computer 100 receives touch detection outputs TA to TR and information identifying a depressed push switch from the tablet device 1, it carries out processing, for example, in accordance with flow charts shown in FIGS. 5 and 6.

Referring to FIGS. 5 and 6, the personal computer 100 first monitors the touch detection outputs TA to TR and determines whether or not a finger 11 has touched any of the operation regions 3A to 3R (step S1). If the personal computer 100 determines at step S1 that none of the operation regions 3A to 3R is touched, then the personal computer 100 executes a different process (step S2).

On the other hand, if it is determined at step S1 that one of the operation regions 3A to 3R is touched, then the personal computer 100 determines whether or not a defined time period T1, for example, T1=500 msec, has elapsed after the touch (step S3). If it is determined at step S3 that the defined time period T1 has not elapsed, then the personal computer 100 determines whether or not the touch is continuing (step S4). If it is detected that the touch is not continuing or the finger 11 is removed from one of the operation regions 3A to 3R, then the personal computer 100 determines that a touch was not intended by the user, and returns to step S1.

On the other hand, if it is detected at step S4 that the touch is continuing, then the personal computer 100 determines whether or not a push switch immediately below (beneath) the operation region being touched is depressed (step S5). If it is decided at step S5 that the push switch is not depressed, then the personal computer 100 returns the processing to step S3, at which it monitors the lapse of time of the defined time period T1 after the touch. On the other hand, if it is detected at step S5 that the push switch is depressed, then the personal computer 100 starts a function assigned to an operation region corresponding to the depressed push switch and then advances the processing to a processing routine of the function (step S6).

On the other hand, if it is detected at step S3 that the defined time period T1 has elapsed after the touch, then the personal computer 100 causes the image information production circuit 110 to synthesize image information (i.e., operational element disposition information) representative of the operation switch array of the operation switch section 3, as well as the image information produced in response to the pointing input to the handwritten information inputting region 2, and supplies all of the produced image information to the display apparatus 101 so that the image information is displayed on the display screen 101D (step S7).

Figure 7A:
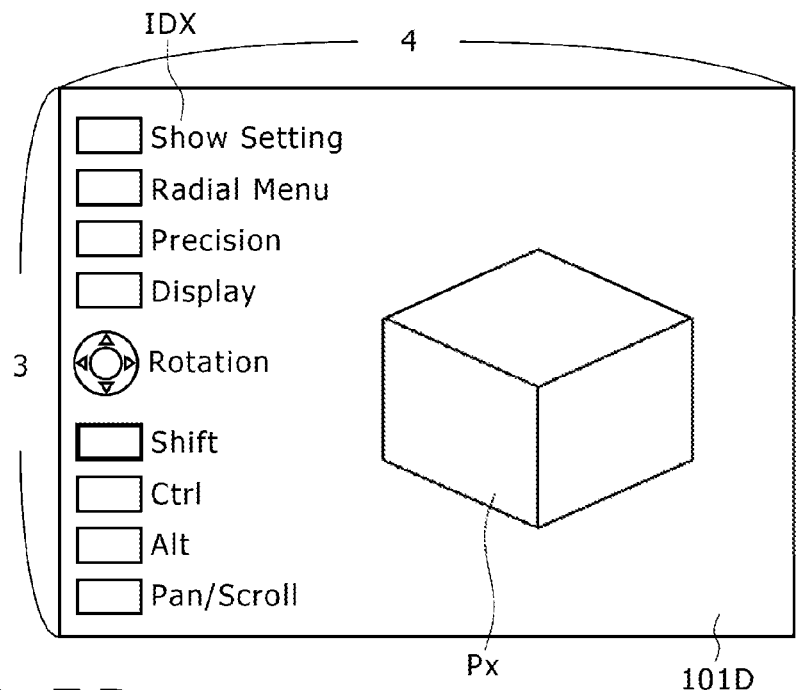
FIGS. 7A and 7B are views each showing a sample display on a screen of an external display apparatus, to which image information is supplied from an embodiment of the electronic apparatus according to the present invention.
Figure 7B:
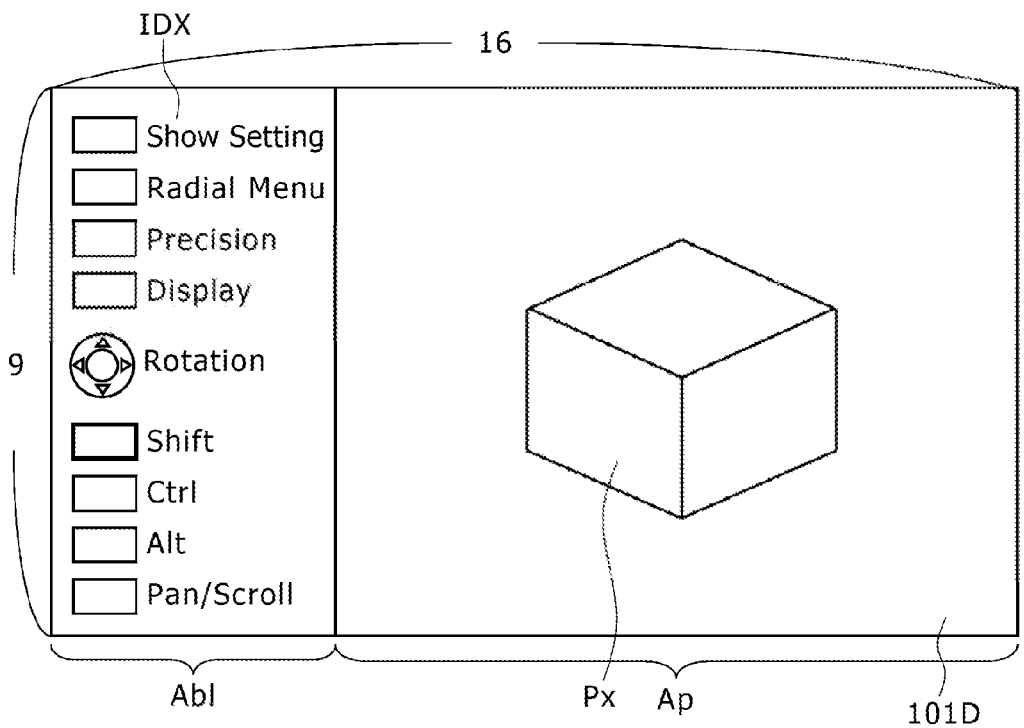

In this instance, the operational element disposition information is image information indicating the plurality of operation regions 3A to 3H and 3R of the operation switch section 3, which is the function disposition region of the tablet device 1, and how they are arrayed relative to each other. Further, in the present example, the operational element disposition information includes textual display of functions assigned to the operation regions 3A to 3R, as shown in FIGS. 7A and 7B. Further, in this instance, the operational element disposition information displayed on the display screen 101D indicates which operation region is selected by, for example, displaying the touched and selected operation region in a different color or in different display luminance as compared to other non-selected operation regions, so that the user can readily determine that this touched operation region is in a selected state.

As shown in FIG. 7A, when the display screen 101D of the display apparatus 101 has an aspect ratio of 4:3, the image information production circuit 110 of the personal computer 100 produces an image IDX of the operational element disposition information, which is overlay-displayed on an input image Px (whose aspect ratio is 4:3) produced in response to the pointing input to the handwritten information inputting region 2. In this instance, the image IDX of the operational element disposition information, which is overlay-displayed on the input image Px, is made transparent at a portion other than the portion that is explicitly displayed as the operational element disposition information (on the left-hand side in FIG. 7A), so that the input image Px can be visually confirmed in the display screen 101D, as shown in FIG. 7A.

As shown in FIG. B, on the other hand, if the stored aspect ratio of the display screen 101D of the display apparatus 101 is 16:9, then the image information production circuit 110 processes the image information of the input image Px (whose aspect ratio is 4:3) in response to the pointing input to the handwritten information inputting region 2, such that the image Px is displayed in the right-hand side region Ap of the display screen 101D while the left-hand side region of the display screen 101D is displayed as a black frame region Abl. Then, the image information production circuit 110 produces an image IDX of the operational element disposition information so that it is displayed in the left-hand side black frame region Abl of the display screen 101D, and synthesizes the image IDX with the image information of the input image Px. Accordingly, in the case of FIG. 7B, since the input image Px and the image IDX of the operational element disposition information do not overlap with each other, even if the image IDX of the operational element disposition information is displayed on the display screen 101D, the user can always view the entire input image Px unobstructed by the image IDX of the operational element disposition information.

Further, in both of the cases of FIGS. 7A and 7B, in the image IDX of the operational element disposition information, a portion displayed on the display screen 101D corresponding to an operation region that has been continuously touched for more than the defined time period T1 by the user (in the present embodiment, the operation region 3E that is assigned a function of "Shift") is distinctively displayed, for example in a thicker frame, in a different color, displayed flickering, or displayed in a somewhat greater size, etc., so that the user can readily determine that this operation region is currently selected. In the example of FIGS. 7A and 7B, the rectangular frame for the operation region 3E is shown thick so as to inform the user that the operation region 3E is currently selected.

When the image IDX of the operational element disposition information is displayed on the display screen 101D of the display apparatus 101 as described above, the personal computer 100 monitors whether or not a different operation region of the operation switch section 3 is touched (step S8). Then, if it is determined at step S8 that a different operation region of the operation switch section 3 is touched, then the personal computer 100 moves the distinctive display described above to a display portion corresponding to the different operation region that is newly touched, so that the user can tell that the different operation region is currently selected (step S9). Then, the personal computer 100 returns the processing to step S8.

On the other hand, if it is detected at step S8 that a different operation region of the operation switch section 3 is not touched, then the personal computer 100 determines whether or not the touch on the touched operation region is continuing (step S11 of FIG. 6). If it is detected at step S11 that the touch is continuing, then the personal computer 100 determines whether or not a push switch immediately beneath the touched operation region is depressed (step S12).

If it is determined at step S12 that the push switch is depressed, then the personal computer 100 stops sending the image IDX of the operational element disposition information to the display apparatus 101 (step S13). Thereafter, the personal computer 100 starts a function assigned to the depressed push switch and advances to a processing routine of the function (step S14).

On the other hand, if it is determined at step S12 that the push switch is not depressed, then the personal computer 100 monitors whether or not a defined time period T3, for example, T3=3 seconds, has elapsed after the last touch detection on an operation region (step S15). If it is determined that the defined time period T3 has not elapsed, then the personal computer 100 returns the processing to step S11. On the other hand, if it is determined at step S15 that the defined time period T3 has elapsed after the touch on an operation region, then the personal computer 100 instructs the image information production circuit 110 to stop the production of the image IDX of the operational element disposition information to stop sending the image IDX of the operational element disposition information to the display apparatus 101 (step S16). Then, the personal computer 100 returns the processing to step S1 to repeat the processes of the steps beginning with step S1.

On the other hand, if it is determined at step S11 that the touch is not continuing and the finger 11 is moved away from the operation region, then the personal computer 100 determines whether or not a defined time period T2, for example, T2=800 msec, has elapsed after the time at which the finger 11 is moved away from the operation region (disappearance of the touch) (step S17). If it is determined at step S17 that the defined time period T2 has not elapsed, then the personal computer 100 decides at step S18 whether or not the finger 11 is touching any of the operation regions 3A to 3R (step S18). If it is determined that the finger 11 is not touching any of the operation regions 3A to 3R, then the personal computer 100 returns the processing to step S17.

On the other hand, if it is determined at step S17 that the defined time period T2 has elapsed after the time at which the finger 11 is moved away from the operation region (disappearance of the touch), then the personal computer 100 returns the processing to step S16, at which it instructs the image information production circuit 110 to stop production of the image IDX of the operational element disposition information so as to stop sending the image IDX of the operational element disposition information to the display apparatus 101. Then, the personal computer 100 returns the processing to step S1 to repeat the processes of the steps beginning with step S1.

On the other hand, if the personal computer 100 determines at step S18 that the finger 11 is touching one of the operation regions 3A to 3R, then it returns the processing to step S7.

Figure 8A:
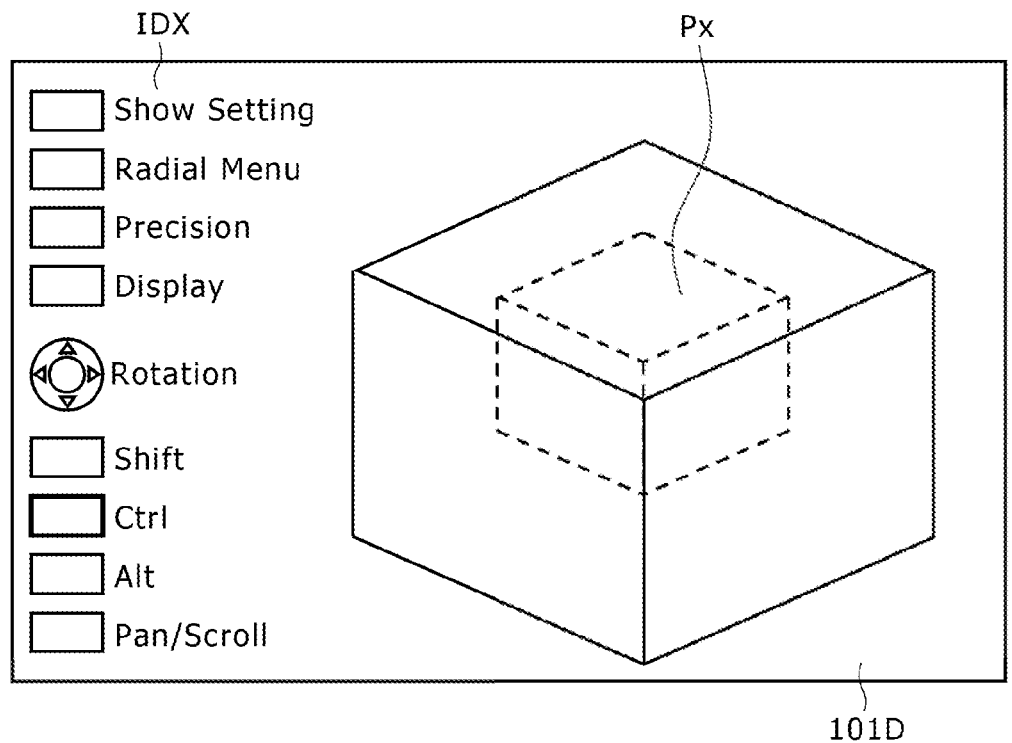
FIGS. 8A and 8B are views each showing a sample display on a screen of an external display apparatus, to which image information is supplied from an embodiment of the electronic apparatus according to the present invention.

It is to be noted that the function executed at steps S6 and S14 is a function relating to inputting of handwritten information by a pointer to the handwritten information inputting region 2 as described above. For example, if, at step S12, a push switch immediately below the operation region 3F, to which a function "ctrl" is assigned, is depressed by the finger 11, the corresponding function is executed at step S14, as shown in FIG. 8A, which involves, for example, enlarging the image Px displayed on the display screen 101D.

Figure 8B:
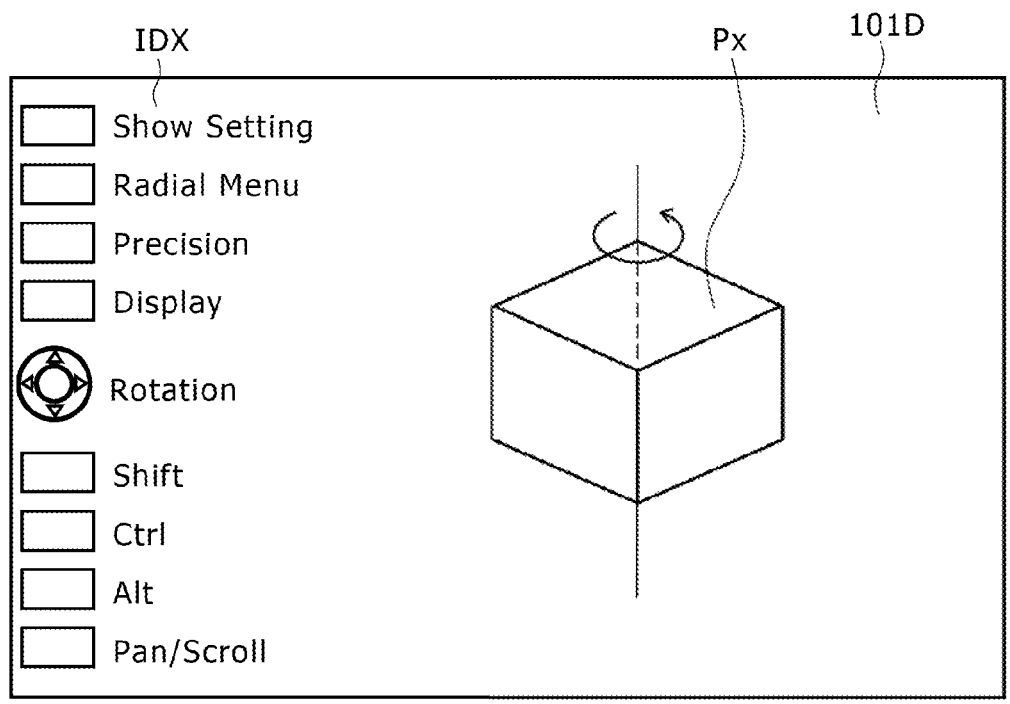

As another example, if a push switch immediately below the touch wheel operation region 3Rb of the operation region 3R (FIG. 1), to which a function "Rotation" is assigned, is depressed at step S12, the rotating function is executed at step S14, which involves rotating the image Px displayed on the display screen 101D, as shown in FIG. 8B.

The touch wheel operation region 3Rb of the operation region 3R may be used also as an operational element to change user selections, when a push switch below another operation region has been depressed and a processing function assigned to that depressed operation region is in operation. For example, when a function or process is initiated by a pressing operation on one of the operation regions 3A-3H, by operating the touch wheel operation region 3Rb, the user can change or designate the color, line width, rotational amount, movement amount, expansion size and reduction size of the handwritten information displayed on the display screen 101D.

Further, in the touch wheel operation region 3Rb of the operation region 3R, a plurality of push switches corresponding to the mark positions indicated by the triangles in FIG. 1 are provided as described above. Thus, when a rotation instruction is to be issued to the drawing input image Px in the handwritten information inputting region 2, if the position of the upwardly or downwardly directed triangle is depressed, for example, then the image Px can be rotated around a horizontal axis that is a first rotational axis. Meanwhile, if the position of the leftwardly or rightwardly directed triangle mark is depressed, then the image Px can be rotated around a vertical axis, which is a second rotational axis different from the first rotational axis.

Effects of the First Embodiment

As described above, with the tablet device 1, provided as the electronic apparatus of the first embodiment, when a touching operation that continues for more than the defined time period T1 to reflect the user's intentional act is detected on any of a plurality of operation regions 3A to 3R provided in the operation switch section 3, an image IDX of the operational element disposition information indicative of the plurality of operation regions 3A to 3R provided in the operation switch section 3 is displayed on the display screen 101D of the external display apparatus 101, as shown in FIGS. 7A and 7B. Further, in the image IDX of the operational element disposition information, the operation region touched by the user is displayed in a manner distinguishable from other operation regions, to thereby indicate which of the operation regions is currently selected, as also shown in FIGS. 7A and 7B.

Accordingly, due to the image IDX of the operational element disposition information being displayed on the display screen 101D, it is not necessary for the user to move his line of sight to the operation switch section 3 in order to operate the operation switch section 3 of the tablet device 1, and consequently, the user can carry out information inputting with a high degree of operability and efficiency. Specifically, the user can input handwritten information using, for example, the electronic pen 10 in the handwritten information inputting region 2, to thereby create a line drawing or the like, while tactually confirming a desired operation region provided on the operation switch section 3 with the finger 11 without having to move his line of sight from the display screen 101D, on which an image Px of the line drawing is displayed. Further, when a processing function assigned to the selected operation region is executed, the user can visually confirm, on the display screen, contents (substance) of the desired processing function being carried out on the handwritten information that has been inputted or is to be inputted. Still further, in the present embodiment, since the image IDX of the operational element disposition information includes text characters that describe the processing functions assigned to various operation regions, the user can carry out each operation while visually confirming a desired processing function to be performed on the display screen 101D.

Accordingly, while drawing the image Px with a pointer in the handwritten information inputting region 2, the user can apply a desired processing function to the image Px without having to move his line of sight from the display screen 101D. For example, the user can operate the operation regions 3A to 3H and 3R of the operation switch section 3 with a finger 11 of the left hand (or the right hand) without having to move his line of sight from the display screen 101D, while performing inputting operation of handwritten information, such as the image Px, in the handwritten information inputting region 2 using the electronic pen 10 held by the right hand (or the left hand).

Since text characters indicative of the functions assigned to the individual operation regions are displayed on the image IDX of the operational element disposition information, even if the user is unfamiliar with operation of the tablet device 1, the user can readily confirm the functions assigned to the individual operation regions.

Further, in the present embodiment, when one of the operation regions provided on the operation switch section 3 of the tablet device 1 is only briefly touched for a period of time shorter than the defined time period T1, an image IDX of the operational element disposition information is not displayed on the display screen 101D. Thus, when the operator does not intend to display the image IDX of the operational element disposition information, an image of the operational element disposition information is not displayed even if an operation region is inadvertently or erroneously touched for a short period of time. Therefore, unnecessary display of the image IDX can be avoided.

Still further, when the aspect ratio of the display screen 101D of the display apparatus 101 is a second aspect ratio of 16:9 different from a first (primary) aspect ratio of 4:3, the image IDX of the operational element disposition information is displayed in the display region that does not overlap with the image Px input by hand writing. Therefore, the user can carry out inputting operation of an image Px by hand writing free of any obstruction by the image IDX of the operational element disposition information.

Further, once the image IDX of the operational element disposition information is displayed on the display screen, then even if a touch on an operation region disappears (e.g., the finger is removed), the image IDX of the operational element disposition information continues to be displayed for the defined time period T2 after the touch disappearance, for improved operability and ease of use by the user.

Modification to the First Embodiment

While, in the first embodiment described above, the image information production circuit 110 is illustrated as embodied in a software program installed in the personal computer 100, it can also be embodied in a hardware structure. Further, it is possible to have the tablet device 1 execute the function of the image information production circuit 110 as a hardware process or a software process based on a program.

In the first embodiment described above, a touch on any of the operation regions 3A to 3H and 3R is detected by the capacitive method, but the handwritten information inputting device may be configured otherwise such that it can detect a touch by the electromagnetic induction method or by the resistance film method.

Second Embodiment

In the first embodiment described above, the handwritten information inputting device is a tablet device that does not have a display screen. However, the present invention can be applied also to an electronic apparatus that includes both a display screen and a function of a handwritten information inputting device, such as a portable electronic apparatus. For example, while a portable information terminal has a display screen of, for example, an LCD (Liquid Crystal Display) or an organic EL (Electro Luminescence) display, since the display screen is small, sometimes it is difficult to view the displayed contents or to carry out operation on the display screen. The present invention provides means suitable for performing a handwritten information input related function on such a portable information terminal.

A second embodiment of the invention described below relates to a portable electronic apparatus, which has a display screen of a small size and yet is configured to address the problem described above.

Figure 10:
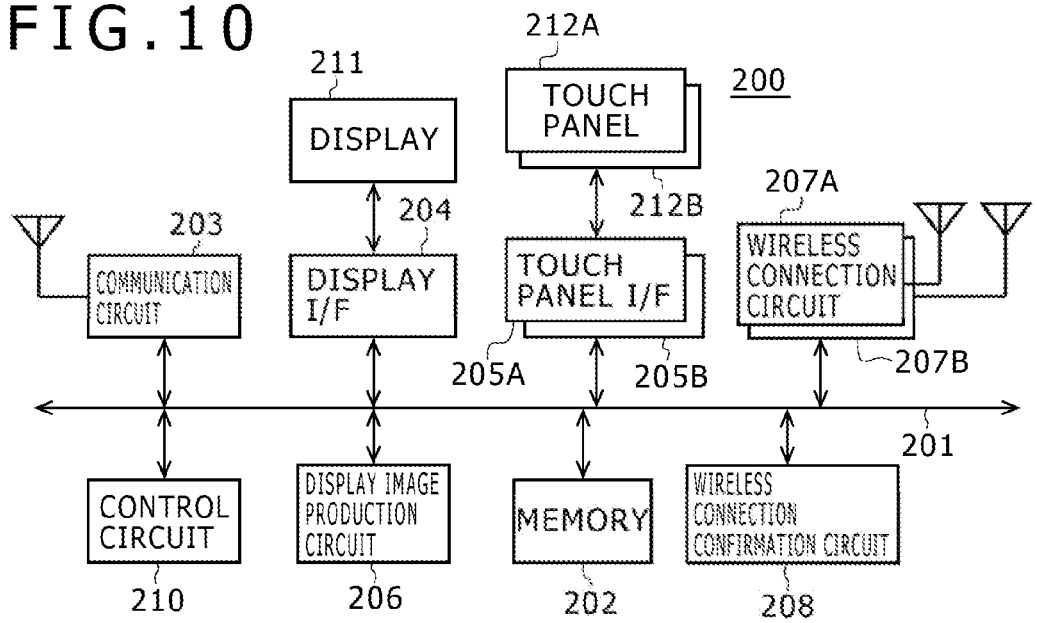
FIG. 10 is a block diagram illustrating a sample configuration of a different embodiment of the electronic apparatus according to the present invention.

FIG. 9 shows a portable telephone terminal 200, which is an example of a portable electronic apparatus according to the second embodiment, and a display apparatus 300, which is an external display apparatus connected by wireless connection to the portable telephone terminal 200. The portable telephone terminal 200 in this example is a high-performance communication terminal called a smart phone. FIG. 10 is a block diagram showing an example of a hardware configuration of the portable telephone terminal 200. It is to be noted that the portable telephone terminal 200 as an example of the electronic apparatus of the second embodiment includes a built-in function as an information processing device and a handwritten information inputting device, as well as a built-in function to connect with an external display apparatus.

The portable telephone terminal 200 includes a control circuit 210 formed, for example, of a microcomputer, a memory 202, a communication circuit 203, a display interface 204, a touch panel interface 205A, a sensor panel interface 205B, a display image production circuit 206, wireless connection circuits 207A and 207B and a wireless connection confirmation circuit 208, which are all connected to a system bus 201.

The memory 202 stores a program for performing telephone communication for the portable telephone terminal 200, and a program for detecting a pointing input based on a touch panel 212A that detects a pointing operation by a finger 221 and a pointing input based on a sensor panel 212B that detects a pointing operation by an electronic pen 220 (e.g., the touch panel 212A of the capacitive type and the sensor panel 212B of the electromagnetic induction type for detecting a pointing operation by the finger 221 and the electronic pen 220, respectively). The memory 202 further includes a program for carrying out wireless connection and wireless communication to and with an external display apparatus via the wireless connection circuits 207A and 207B. The memory 202 also includes other application programs and storage regions for storing various data.

The control circuit 210 uses a defined program from among the programs stored in the memory 202 to carry out software processing to execute functions of an information processing device. The function of the handwritten information inputting device is carried out based on software processing of the control circuit 210, the touch panel interface 205A, the sensor panel interface 205B, the touch panel 212A and the sensor panel 212B. Further, the function of a connection circuit is carried out based on software processing of the control circuit 210, the wireless connection circuits 207A and 207B and the wireless connection confirmation circuit 208.

The communication circuit 203 having an antenna is a circuit configured to carry out portable telephone communication. A display 211 formed, for example, of an LCD, is connected to the display interface 204. A touch panel 212A, for example, of the capacitive type, is connected to the touch panel interface 205A. Further, a sensor panel 212B, for example, of the electromagnetic induction type, is connected to the sensor panel interface 205B. The touch panel 212A of the capacitive type and the sensor panel 212B of the electromagnetic induction type are disposed in a superposed relationship on the display 211.

As shown in FIG. 9, the touch panel 212A of the capacitive type having transparency (not specifically shown) is disposed in a superposed relationship on (over) a display screen 211D, so that a pointing operation by the finger 221 as a pointer can be detected at any location on the display screen 211D of the display 211, which may be a monitor apparatus, a projector apparatus or a TV receiver apparatus, for example. In this example, the sensor panel 212B of the electromagnetic induction type (not specifically shown) is also disposed in a superposed relationship on (beneath) the display screen 211D so that a pointing operation by the electronic pen 220 can be detected at any location on the display screen 211D. Although the sensor panel 212B of the electromagnetic induction type is typically disposed on the opposite (rear) side of the display screen 211D, when the sensor panel 212B is formed of transparent electrodes of an ITO film or the like, it is possible to dispose the sensor panel 212B of the electromagnetic induction type in a superposed relationship between the (transparent) touch panel 212A and the display screen 211D.

In the present example, the sensor panel 212B of the electromagnetic induction type is disposed on the rear face side (lower side) of the display screen 211D of the display 211, while the touch panel 212A of the capacitive type is disposed on the display screen 211D side (upper side) of the display 211. It is to be noted that the touch panel 212A of the capacitive type is typically formed by arranging transparent electrodes of an ITO film or the like on a transparent substrate, as well known in the art.

The display image production circuit 206 produces image information to be displayed on the display 211. The wireless connection circuits 207A and 207B produce radio signals to allow the image information, produced by the display image production circuit 206, to be displayed on the display apparatus 300, which is an external display apparatus. It should be noted that the display image production circuit 206 may be implemented as a software processing functional section executed by the control circuit 210 based on a program stored in the memory 202.

The wireless connection circuit 207A is a wireless communication function section in compliance with, for example, the Bluetooth standards, for which an antenna is provided in the housing of the portable telephone terminal. The wireless connection circuit 207B is a wireless communication function section in compliance with, for example, the WiFi (registered trademark) standards, also for which an antenna is provided in the housing. While two wireless connection circuits are provided in the present example, three or more wireless connection circuits may be provided.

Which one of the wireless connection circuit 207A and the wireless connection circuit 207B is used depends on which transmission standards are adopted by the wireless connection circuit of the external display apparatus 300.

The wireless connection confirmation circuit 208 is a circuit, which performs a search using the wireless connection circuit 207A and the wireless connection circuit 207B, to determine which transmission standards are adopted by the wireless connection circuit provided in the external display apparatus 300. When the user of the portable telephone terminal 200 desires to perform image transmission to the external display apparatus 300, the user first performs a defined operation on the touch panel 212A or the sensor panel 212B, to activate the wireless connection confirmation circuit 208 to register a "pairing" regarding wireless communication with the external display apparatus 300. This function of the wireless connection confirmation circuit 208 may be implemented as a software processing function executed by the control circuit 210 based on a program stored in the memory 202.

Figure 11:
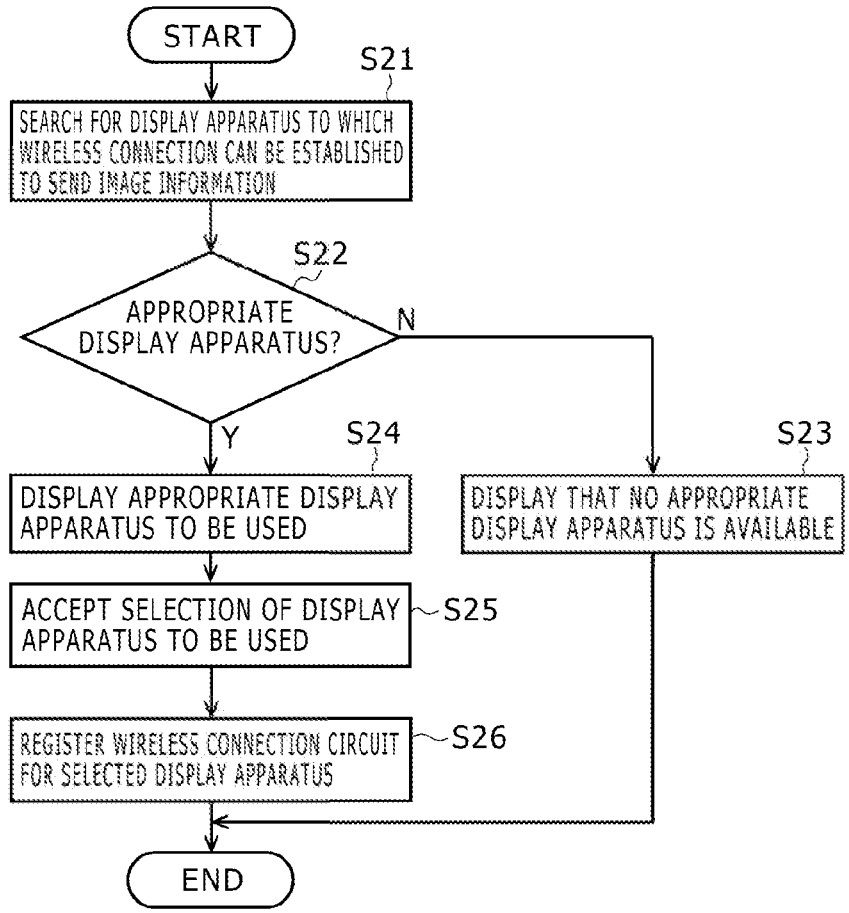
FIG. 11 is a flow chart of a processing operation of a different embodiment of the electronic apparatus according to the present invention.

FIG. 11 is a flow chart illustrating an example of operation performed by the wireless connection confirmation circuit 208 to register pairing regarding wireless communication.

The control circuit 210 searches for a display apparatus, to which a wireless connection can be established by the wireless connection circuit 207A or 207B to send image information (step S21), and determines whether or not such a display apparatus exists as an external display apparatus (step S22). If it is determined at step S22 that an appropriate display apparatus does not exist, then the control circuit 210 displays on the display screen 211D that no appropriate display apparatus is available (step S23) and ends the processing routine.

On the other hand, if it is determined at step S22 that an appropriate display apparatus exists, then the control circuit 210 displays a table of such display apparatuses on the display screen 211D (step S24). In this instance, if only one appropriate display apparatus exists, only the one display apparatus is displayed in the table.

Then, the control circuit 210 accepts the user's selection of a display apparatus from within the table (step S25), and registers a wireless connection circuit for achieving a wireless connection with the selected display apparatus (step S26). Then, the processing routine ends. When only one appropriate display apparatus exists, the process at step S25 involves confirming acceptance of the one appropriate display apparatus.

The portable telephone terminal 200 of the present example includes, as one of the application programs stored in the memory 202, a handwritten information inputting application. The handwritten information inputting application allows inputting of handwritten information onto the display screen 211D using a pointer such as an electronic pen 220, which includes a resonance circuit in a housing, a finger 221, or the like, as shown in FIG. 9.

In the handwritten information inputting application, the display screen 211D of the display 211 includes a relatively narrow region on the left-hand side of a broken line 230 as a function disposition region 231, and a relatively wide region on the right-hand side of the broken line 230 as a handwritten information inputting region 232, as shown in FIG. 9. Further, in the handwritten information inputting application, in the function disposition region 231, icons 233A, 233B and 233C, to which various processing functions regarding handwritten input information are assigned, are displayed in an array on the display screen 211D. In this instance, the assigned processing functions regarding handwritten input information include, for example, changing a display color of the handwritten inputted image information, changing the line thickness of, rotating, moving, expanding (enlarging), reducing, or selecting the line type of the handwritten inputted image information, and so forth.

In the example of FIG. 9, three processing functions are assigned to the three icons 233A, 233B and 233C, but of course the number of icons corresponding to the number of processing functions to be assigned thereto can be freely determined according to each application.

The icons 233A, 233B and 233C form operational elements, each as an object to be operated by the user. As hereinafter described, if any of the icons 233A, 233B and 233C is operated on the touch panel 212A of the capacitive type by a pointer such as the finger 221 or the electronic pen 220, then the control circuit 210 detects the operation of the icon 233A, 233B or 233C and executes a process in accordance with a result of the detection. In the present example, for each of the icons 233A, 233B and 233C, a first gesture and a second gesture are defined as operation modes to be applied to each icon.

The first gesture is a gesture operation wherein a touch state on any of the icons 233A, 233B and 233C continues for a defined period of time. If the control circuit 210 detects this first gesture, then it produces image information, which includes operational element disposition information including a disposition image of the icons 233A, 233B and 233C disposed in the function disposition region 231 and a handwritten input image drawn in the handwritten information inputting region 232, and supplies the produced image information to the external display apparatus 300. An image IDXa of the operational element disposition information and a handwritten input image Pxa are displayed, as shown in FIG. 9, on a display screen 300D of the external display apparatus 300. In short, in the present example, the control circuit 210 supplies information on an image displayed on the display screen 211D of the display 211 to the external display apparatus 100 so that the image is displayed on the display screen 300D of the display apparatus 300.

It is to be noted that only those operational elements to which functions related to processing of handwritten information are assigned, such as the icons 233A, 233B and 233C disposed in the function disposition region 231, are configured such that when it is touched continuously for more than the defined time period T1, the operational element disposition information is supplied to the external display apparatus 300. On the other hand, other operational buttons provided on the housing of the portable telephone terminal 200, such as a home button formed of a push button or the like, are not configured as an operational element that causes display of the operational element disposition information.

Meanwhile, the second gesture is a gesture, different from the first gesture, on the icons 233A, 233B and 233C as operational elements, such as a double-tapping operation, for example. To the icons 233A, 233B and 233C disposed on the function disposition region 231, different processing functions related to handwritten input information are assigned. If the control circuit 210 detects this second gesture, then it starts up the actual processing function corresponding to one of the icons 233A, 233B and 233C disposed on the function disposition region 231, from which the second gesture is detected.

It is to be noted that a double tapping operation as the second gesture for starting up a processing function is merely one example, and any other gesture operation can be used as the second gesture as long as the gesture operation is distinguishable from the first gesture to signify starting up of the corresponding function.

The touch panel 212A of the capacitive type and the sensor panel 212B of the electromagnetic induction type detect a position pointed to by a pointer such as the electronic pen 220 or the finger 221 on the display screen 211D, and supply the detected pointed position information to the control circuit 210. The control circuit 210 recognizes, from the received pointed position information, whether the pointed position information is a pointing input to the function disposition region 231 or a pointing input to the handwritten information inputting region 232, and executes a process corresponding to the recognized operation region using a program stored in the memory 202. Further, the control circuit 210 evaluates a time situation of the pointing input by the pointer, such as the electronic pen 220 or the finger 221, to determine whether the pointing input is the first gesture or the second gesture.

Figure 12:
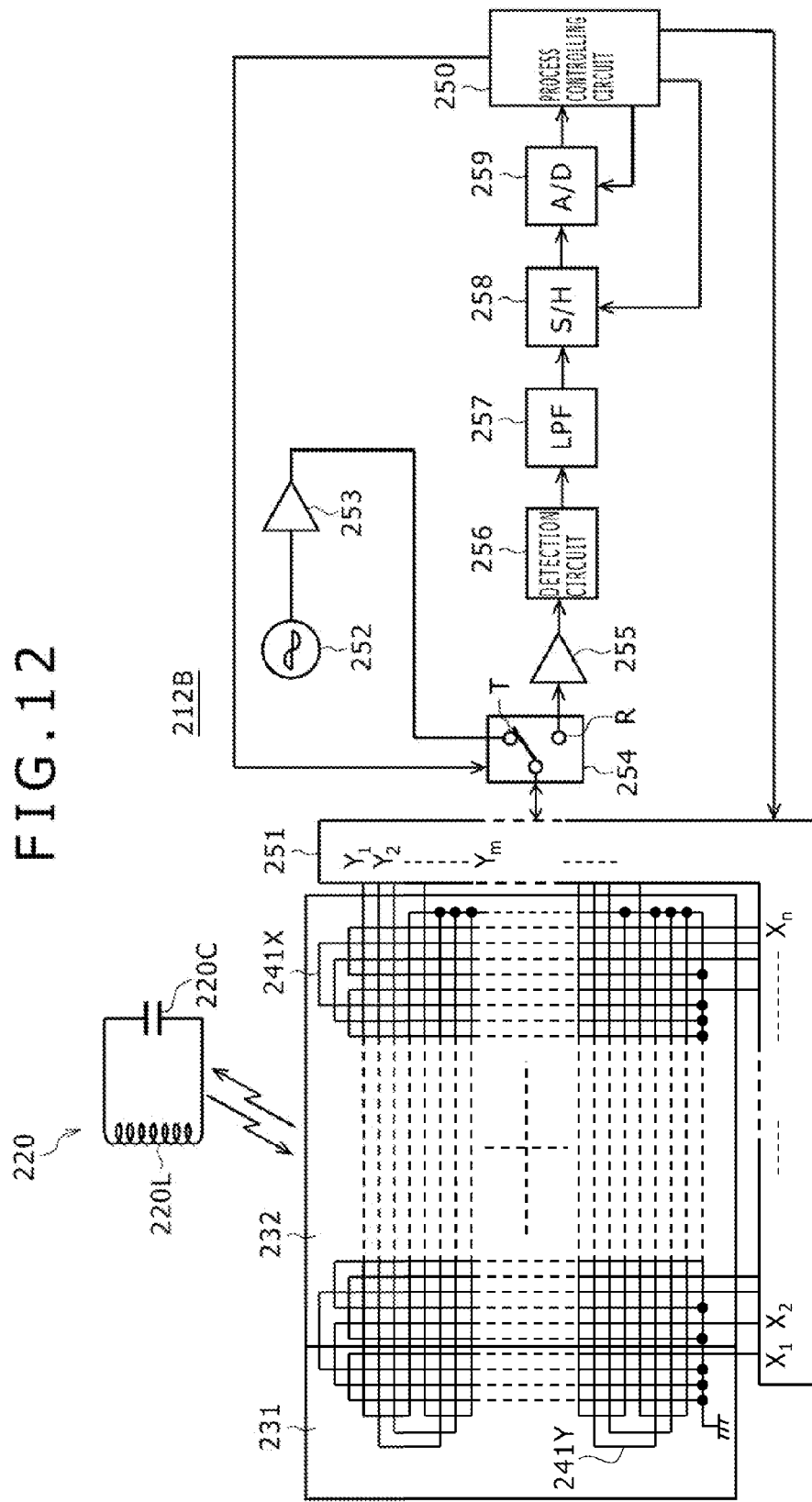
FIG. 12 is a view illustrating a sample configuration of a sensor section used in a different embodiment of the electronic apparatus according to the present invention.

In this instance, the sensor panel 212B is configured of the electromagnetic induction type, as shown in FIG. 12 for example. The electronic pen 220, which is used as a pointer for the sensor panel 212B of the electromagnetic induction type, includes a built-in resonance circuit configured from a coil 220L and a capacitor 220C connected in parallel to the coil 220L, as shown in FIG. 12.

In the sensor panel 212B, an X-axis direction loop coil group 241X and a Y-axis direction loop coil group 241Y are disposed on different faces of a wiring substrate (not specifically shown) and disposed in a superposed relationship on each other. In this example, each of the loop coil groups 241X and 241Y is configured from a plurality of rectangular loop coils, and n loop coils are disposed in the X-axis direction while m loop coils are disposed in the Y-axis direction. Further, the loop coil groups 241X and 241Y are disposed not only in the handwritten information inputting region 232 but also in the function disposition region 231 so that the overall display screen 211D including the function disposition region 231 is covered as a detection region.

Further, a sensor circuit section is provided on the sensor panel 212B. The sensor circuit section includes a selection circuit 251, an oscillator 252, a current driver 253, a transmission/reception switching circuit 254, a reception amplifier 255, a detection circuit 256, a low-pass filter 257, a sample hold circuit 258, an A/D (Analog to Digital) conversion circuit 259 and a process controlling circuit 250.

The X-axis direction loop coil group 241X and the Y-axis direction loop coil group 241Y are connected to the selection circuit 251. The selection circuit 251 successively selects one loop coil of the two loop coil groups 241X and 241Y in accordance with a controlling instruction from the process controlling circuit 250.

The oscillator 252 generates an ac signal of a frequency f0. The ac signal is supplied to and converted into current by the current driver 253, whereafter it is sent to the transmission/reception switching circuit 254. The transmission/reception switching circuit 254 switches between the connection destination (between the transmission side terminal T and the reception side terminal R), to which the loop coil selected by the selection circuit 251 is to be connected, after every defined period of time under the control of the process controlling circuit 250. The current driver 253 is connected to the transmission side terminal T, and the reception amplifier 255 is connected to the reception side terminal R.

Accordingly, during transmission time, the ac signal from the current driver 253 is supplied to the loop coil selected by the selection circuit 251 through the transmission side terminal T of the transmission/reception switching circuit 254. On the other hand, during reception time, an induced voltage generated in the loop coil selected by the selection circuit 251 is supplied to the reception amplifier 255 through the selection circuit 251 and the reception side terminal R of the transmission/reception switching circuit 254 and amplified by the reception amplifier 255, whereafter it is sent to the detection circuit 256.

A signal detected by the detection circuit 256 is supplied, through the low-pass filter 257 and the sample hold circuit 258, to the A/D conversion circuit 259. The A/D conversion circuit 259 converts the analog signal into a digital signal and supplies the digital signal to the process controlling circuit 250.

The process controlling circuit 250 carries out control for position detection. In particular, the process controlling circuit 250 controls selection of a loop coil by the selection circuit 251, signal switching in the transmission/reception switching circuit 254, the timing of the sample hold circuit 258, and so forth.

The process controlling circuit 250 changes over the transmission/reception switching circuit 254 so as to be connected to the transmission side terminal T, to carry out energization control of a loop coil selected from within the X-axis direction loop coil group 241X or the Y-axis direction loop coil group 241Y by the selection circuit 251, and to have the selected loop coil transmit an electromagnetic wave. The resonance circuit in the electronic pen 220 as a pointer receives the electromagnetic wave transmitted from the loop coil and accumulates energy.

Thereafter, the process controlling circuit 250 changes over the transmission/reception switching circuit 254 so as to be connected to the reception side terminal R. Consequently, in the loop coils of the X-axis direction loop coil group 241X and the Y-axis direction loop coil group 241Y, an induced voltage is generated by an electromagnetic wave transmitted from the electronic pen 220. The process controlling circuit 250 calculates a coordinate value of the pointed position in the X-axis direction and the Y-axis direction on the display screen 211D based on the level of the voltage values of the induced voltages generated in the loop coils. Then, the process controlling circuit 250 supplies information of the calculated coordinate value to the control circuit 210 through the sensor panel interface 205B and the system bus 201.

The touch panel 212A of the capacitive type may have, for example, the configuration of the sensor disclosed in the patent document (Japanese Patent Laid-Open No. 2011-3035) similarly to that in the handwritten information inputting region 2 of the first embodiment. In the illustrated example, the touch panel 212A is configured such that a plurality of electrodes in the X-axis direction and a plurality of electrodes in the Y-axis direction are provided over the entire area of the display screen 211D similarly to the sensor panel 212B of the electromagnetic induction type. The control circuit 210 recognizes, based on the position coordinate output of the touch panel 212A, whether the position coordinate output is a pointing input to the function disposition region 231 or a pointing input to the handwritten information inputting region 232, and executes a process corresponding to the recognized region using a program stored in the memory 202.

Accordingly, in the portable telephone terminal 200 as an example of the electronic apparatus of the second embodiment, inputting of handwritten information to the handwritten information inputting region 232 can be carried out using the electronic pen 220 or using the finger 221. Similarly, detection of an operational element in the function disposition region 231 as well as activation of processes assigned to the operational elements of the function disposition region 231 can be carried out using the electronic pen 220 or using the finger 221. According to this configuration, since operations of the electronic pen 220 and the finger 221 can be detected not only in the handwritten information inputting region 232 but also in the function disposition region 231, it is possible to carry out inputting of handwritten information to the handwritten information inputting region 232 using either the electronic pen 220 or the finger 221 while operating the operational elements in the function disposition region 231. Further, since the electronic pen 220 and the finger 221 can be operated simultaneously, it is possible to use multiple pointers to carry out inputting of handwritten information to the handwritten information inputting region 232 and to use multiple pointers to operate the operational elements in the function disposition region 231.

Figure 13:
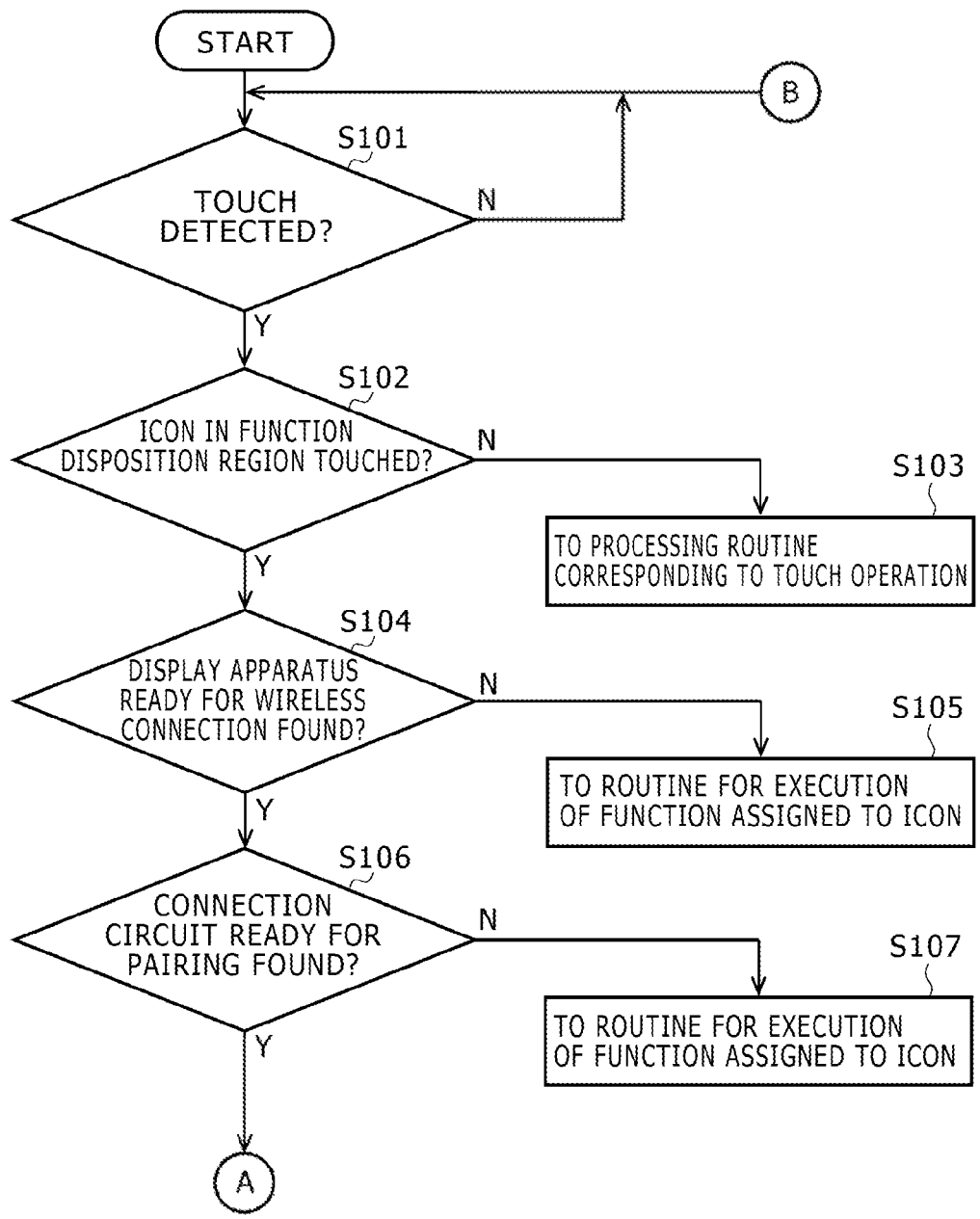
FIGS. 13-15 are each show a portion of a flow chart of a processing operation of a different embodiment of the electronic apparatus according to the present invention.

Now, a sample operation of the handwritten inputting application described above, to be performed by the control circuit 210, is described with reference to flow charts of FIGS. 13 to 15.

The control circuit 210 monitors coordinate outputs from the touch panel 212A and the sensor panel 212B, to determine whether a touch on the display screen 211D by a pointer such as a finger 221 or an electronic pen 220 is detected (step S101). If a touch is not detected, then the control circuit 210 returns the processing to step S101 to continue monitoring for a touch.

If it is determined at step S101 that a touch by a pointer is detected, then the control circuit 210 determines whether or not any of the icons 233A, 233B and 233C as operational elements provided in the function disposition region has been touched (step S102). If it is determined at step S102 that none of the icons 233A, 233B and 233C in the function disposition region 231 is touched, then the control circuit 210 carries out a process in response to the detected touch operation (step S103). At step S103, the control circuit 210 accepts, for example, an input of handwritten information to the handwritten information inputting region 232 and produces image information of the received information, and then carries out a process for displaying a handwritten inputting image on the display screen 211D of the display 211 or a like process in accordance with the produced image information.

If it is determined at step S102 that one of the icons 233A, 233B and 233C of the function disposition region 231 is touched, then the control circuit 210 starts up the wireless connection confirmation circuit 208 to decide whether or not there exists an external display apparatus to which wireless connection can be established (step S104).

If it is decided at step S104 that no external display apparatus exists, then the control circuit 210 executes a process relating to a processing function assigned to the touched icon, which is other than a process relating to transmission of the image information to the external display apparatus (step S105).

On the other hand, if it is decided at step S104 that there exists an external display apparatus to which wireless connection can be established, then the control circuit 210 decides whether or not there exists a wireless connection circuit that can be paired with the external display apparatus, to which wireless connection can be established (step S106). If it is decided at step S106 that there exist no wireless connection circuit with which pairing is possible, then the control circuit 210 executes a process relating to a processing function assigned to the touched icon other than the process relating to transmission of the image information to the external display apparatus (step S107).

Figure 14:
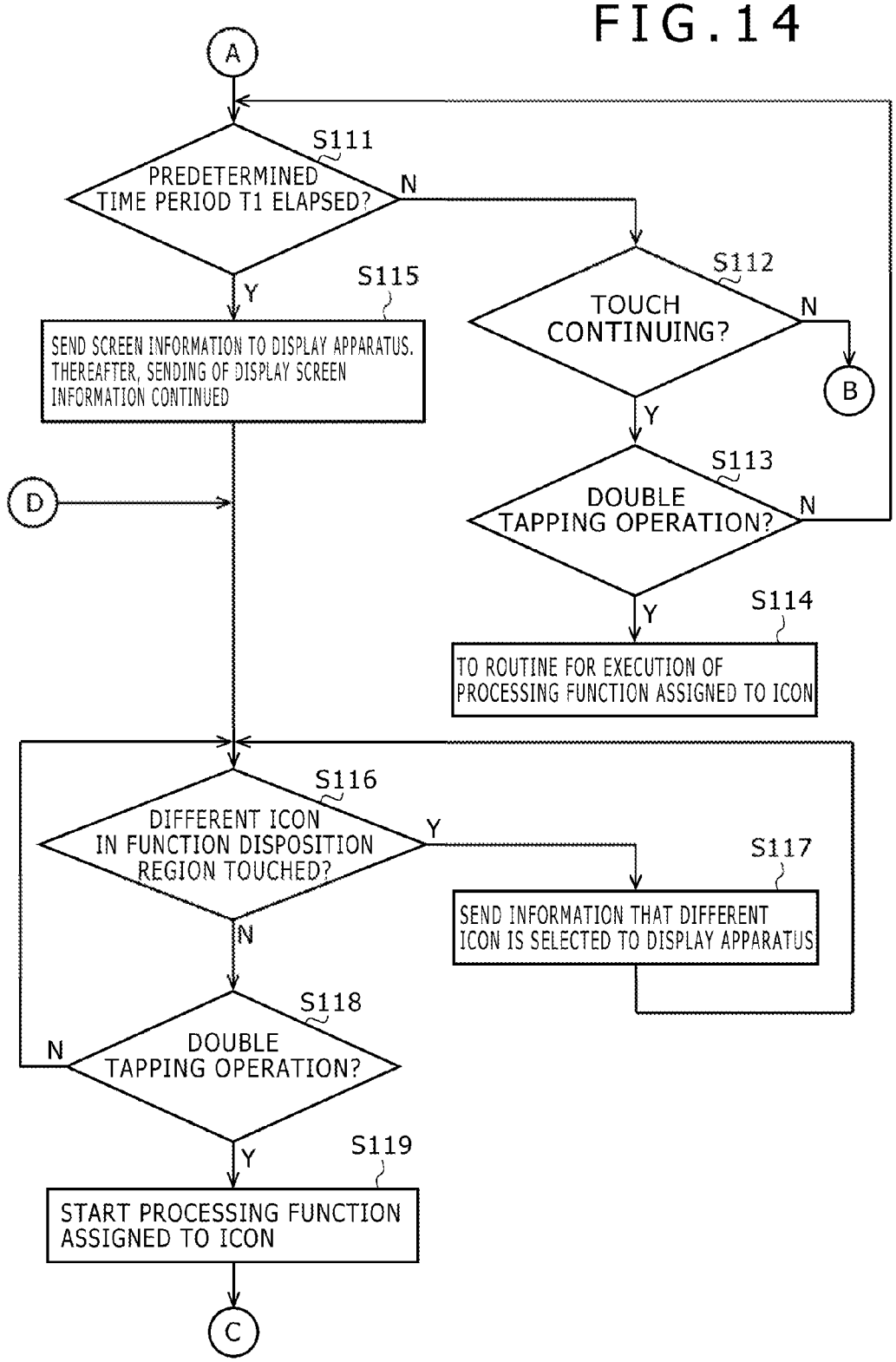

On the other hand, if it is decided at step S106 that there exists a wireless connection circuit with which pairing is possible, then the control circuit 210 determines whether or not a defined time period T1 has elapsed since the touch on an icon was detected at step S102 (step S111 of FIG. 14). In other words, at step S111, the control circuit 210 determines whether or not a first gesture operation is carried out.

If it is determined at step S111 that the defined time period T1 has not elapsed, then the control circuit 210 determines whether or not the touch on an icon detected at step S102 is continuing (step S112). If it is determined at step S112 that the touch on an icon detected at step S102 is not continuing, that is, the touch has been cancelled (removed), then the control circuit 210 returns the processing to step S101.

On the other hand, if it is determined at step S112 that the touch on an icon as an operational element detected at step S102 is continuing, then the control circuit 210 determines whether or not a double tapping operation, that is, a second gesture operation, is carried out on the icon (step S113). If it is decided at step S113 that a double tapping operation is carried out on the icon as an operational element, then the control circuit 210 starts up and executes a processing function assigned to the icon (step S114). At step S114, the control circuit 210 carries out a processing function assigned to the icon and related to handwritten information, for example, change of a display color, change of the thickness or the type of a drawing line, rotation, movement, expansion and reduction of a drawn image.

On the other hand, if it is decided at step S111 that the defined time period T1 has elapsed, that is, if the first gesture operation is detected, then the control circuit 210 supplies image information to the external display apparatus 300 through the wireless connection circuit 207A or 207B, for which pairing has been registered (step S115). The supplied image information includes an image IDXa of the operational element disposition information formed of images of the icons 233A, 233B and 233C disposed in the function disposition region 231 and a handwritten image Pxa drawn in the handwritten information inputting region 232. At this time, in the operational element disposition information including the images of the icons 233A, 233B and 233C disposed in the function disposition region 231, the touched icon is rendered distinguishable from other icons. For example, the touched icon is indicated with a thick frame, displayed in a different color, and so forth, such that it is visually recognizable that the touched icon (operational element) is currently selected. Further, in the second embodiment, unlike in the first embodiment, once supply of the image information to the external display apparatus 300 is started, the control circuit 210 continues to supply the image information to the external display apparatus 300 even after a defined time period has lapsed until and unless an explicit instruction to discontinue the supply of the image information is received from the user, as hereinafter described.

Though not shown, in the second embodiment also, the portable telephone terminal 200 recognizes the aspect ratio of the display screen 300D of the wirelessly connected external display apparatus 300 in advance. When the aspect ratio is 4:3, the image IDXa of the operational element disposition information is displayed in the form in which it is superposed on the handwritten input image Pxa, as shown in FIG. 9. On the other hand, when the aspect ratio is 16:9, as shown in FIG. 7B, the image IDXa of the operational element disposition information is displayed in a black frame region other than the display region for the handwritten input image Pxa so that the images IDXa and Pxa do not overlap with each other.

Returning to FIG. 14, the control circuit 210 then decides whether or not a different icon in the function disposition region 231 is touched (step S116). If it is decided at step S116 that a different icon in the function disposition region 231 is touched, then the control circuit 210 produces image information that indicates that the different icon is touched and selected. The control circuit 210 sends the produced image information to the external display apparatus 300, through the paired wiring connection circuit, for display on the display screen 211D (step S117). Thereafter, the control circuit 210 returns the processing to step S116 and repeats the processes beginning with step S116.

If it is decided at step S116 that a different icon in the function disposition region 231 is not touched, then the control circuit 210 decides whether or not a double tapping operation (i.e., the second gesture operation in this example) is carried out on the icon that is currently touched (step S118). If it is decided that a double tapping operation is not carried out, then the control circuit 210 returns the processing to step S116.

If it is decided at step S118 that a double tapping operation is carried out on the icon that is currently touched, then the control circuit 210 starts up a processing function assigned to the icon (step S119).

Figure 15:
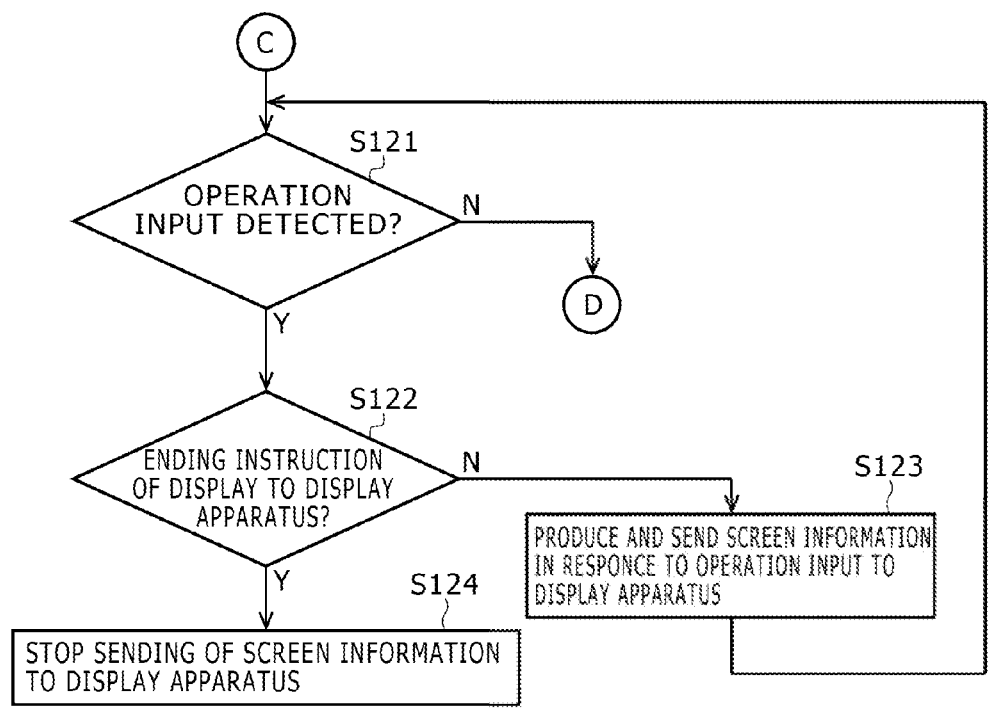

Then, the control circuit 210 decides whether or not an operation input (i.e., an input via an operational element) to the display screen 211D has been received (step S121 of FIG. 15). If it is decided that an operation input is not received, then the control circuit 210 returns the processing to step S116 and repeats the processes beginning with step S116.

If it is decided at step S121 that an operation input is received, then the control circuit 210 decides whether or not the operation input is an instruction to stop supply of an image to the external display apparatus 300 (step S122). If it is decided at step S122 that the operation input is not the instruction to stop supply of an image to the external display apparatus 300, then the control circuit 210 executes a process corresponding to the received operation input on the handwritten (hand-drawn) information displayed on the handwritten information inputting region 232. The control circuit 210 then produces image information and sends the image information to the external display apparatus 300, through the wireless connection circuit, in order to display the image information on the display screen 211D (step S123).

On the other hand, if it is decided at step S122 that the operation input is an instruction to stop supply of an image to the external display apparatus 300, then the control circuit 210 stops sending of the image information to the external display apparatus 300 (step S124).

With the electronic apparatus of the second embodiment described above, handwritten information inputting to a display screen of a portable telephone terminal can be carried out using a larger display screen of an external display apparatus. In this case, operational element disposition information comprised of a plurality of icons, which is displayed on the display screen of the portable telephone terminal, is also displayed on the external display apparatus so that a user can select the icons similarly as if the user is performing a routine icon selection operation on the display screen of the display apparatus. That is, the user can carry out handwritten inputting operation without having to move his eyes off the display screen of the external display apparatus.

Other Embodiments and Modifications

In the embodiments described above, an image of the operational element disposition information is displayed on the external display apparatus when any of the operational elements included in the function disposition region is touched continuously for more than the defined time period T1. However, the operational element disposition information may be displayed on the external display apparatus only when a specific operational element, determined in advance from among the plurality of operational elements included in the function disposition region, is touched continuously for more than the defined time period T1.

In the first embodiment described above, the tablet device 1 as a handwritten information inputting device is connected to the personal computer 100, and the personal computer 100 is configured to carry out information processing such as to produce image information to be displayed on the external display apparatus based on pointer position information and operation input information received from the tablet 1, and to establish connection with the external display apparatus, wirelessly or via wire, to transmit the produced image information thereto. However, the present invention is not limited to such a configuration and includes other configurations, such as a notebook-type personal computer with a display apparatus function, to which a tablet device is connected wirelessly or by wire.

Further, when the external display apparatus includes a function as an information processing device, as in a personal computer, it is possible to adopt a configuration in which a tablet device is connected to the external display apparatus wirelessly or by wire.

As described hereinabove, the function as an information processing device involves carrying out information processing based on pointer position information and operation input information received from the tablet device 1. The function is typically carried out by a CPU, memory, and software that operates the CPU. Accordingly, by incorporating an information processing device into a tablet device, it is possible to adopt a configuration in which a tablet that incorporates an information processing device is connected to an external display apparatus, wirelessly or by wire.

While the electronic apparatus of the second embodiment is described above as a portable telephone terminal, the electronic apparatus according to the present invention is not limited to this particular configuration, and may be embodied in any portable electronic apparatus as long as it is connectable to an external display apparatus wirelessly or by wire and it includes a handwritten information inputting function.

The various embodiments described above can be combined to provide further embodiments. All of the U.S. patents, U.S. patent application publications, U.S. patent applications, foreign patents, foreign patent applications and non-patent publications referred to in this specification are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A handwritten information inputting device, for use with an external display to be coupled via a wireless connection, the handwritten information inputting device comprising:
   a handwritten information inputting region over a first sensor, into which handwritten information corresponding to an operation of a pointer is to be inputted;
   a function disposition region disposed in a different region from the handwritten information inputting region over a second sensor different from the first sensor, in which a plurality of operational elements are disposed, wherein the operational element includes a touch sensor configured to detect a first touching gesture and a second touching gesture different from the first touching gesture; and
   a processor configured to:
      transmit, over the wireless connection to the external display, operational element disposition information to be shown on the external display in response to the first touching gesture on one of the operational elements, wherein the first touching gesture is a continuous touching of the operational element for a defined period of time;
      in response to the second touching gesture on the continuously-touched operational element, activate and apply a process assigned to the continuously-touched operational element on the handwritten information to generate processed handwritten information, transmit the processed handwritten information over the wireless connection to be shown on the external display, and stop transmitting the operational element disposition information to the external display.

2. The handwritten information inputting device according to claim 1, wherein each operational element is assigned a process selected from a group consisting of change of a display color, change of a drawing line width, rotation, movement, enlargement, and reduction related to the handwritten information shown on the external display.

3. The handwritten information inputting device according to claim 2, wherein the function disposition region includes a touch wheel operational element for designating a rotation amount such that, by operating the touch wheel operational element in response to activation of a process assigned to one of the operational elements, an amount of change of display color, an amount of change of a drawing line width, a rotation amount, a movement amount, an enlargement size, or a reduction size can be designated regarding the handwritten information shown on the external display.

4. The handwritten information inputting device according to claim 1, wherein the second touching gesture is a double-tapping of an operational element.

5. The handwritten information inputting device according to claim 1, wherein the touch sensor of the operational element is a capacitive type sensor.

6. The handwritten information inputting device according to claim 1, wherein a capacitive type sensor is disposed in the handwritten information inputting region to detect inputting of the handwritten information thereon with the pointer.

7. The handwritten information inputting device according to claim 1, wherein the pointer includes a resonance circuit and the handwritten information inputting region includes a loop coil disposed therein, such that inputting of the handwritten information corresponding to an operation of the pointer carried out in the handwritten information inputting region is detected based on an electromagnetic coupling between the resonance circuit in the pointer and the loop coil.

8. The handwritten information inputting device according to claim 7, wherein the loop coil is disposed so as to detect an operation of the pointer on the operational elements disposed in the function disposition region.

9. The handwritten information inputting device according to claim 1, wherein the operational element disposition information is shown on the external display adjacent to a region on the external display in which the inputted handwritten information is shown.

10. The handwritten information inputting device according to claim 1, wherein the operational element disposition information is shown on the external display in a superposed relationship with a region on the external display in which the inputted handwritten information is shown.

11. The handwritten information inputting device according to claim 1, wherein, to each of the operational elements, a plurality of processes related to the handwritten information inputted in the handwritten information inputting region are selectably assigned.

12. A portable electronic apparatus for use with an external display to be coupled via a wireless connection, the portable electronic apparatus comprising:
   a handwritten information inputting device; and
   an information processing device;
   wherein the handwritten information inputting device includes a handwritten information inputting region over a first sensor, into which handwritten information corresponding to an operation of a pointer is to be inputted, and a function disposition region disposed in a different region from the handwritten information inputting region over a second sensor different from the first sensor, in which a plurality of operational elements are disposed, wherein the operational element includes a touch sensor configured to detect a first touching gesture and a second touching gesture different from the first touching gesture; and
   wherein the handwritten information inputting device and the information processing device cooperate with each other to perform:
      transmitting, over the wireless connection to the external display, operational element disposition information to be shown on the external display in response to the first touching gesture on one of the operational elements, wherein the first touching gesture is a continuous touching of the operational element for a defined period of time; and
      in response to the second touching gesture on the continuously-touched operational element, activating and applying a process assigned to the continuously-touched operational element on the handwritten information to generate processed handwritten information, transmitting the processed handwritten information over the wireless connection to be shown on the external display, and stopping transmission of the operational element disposition information to the external display.

13. The portable electronic apparatus according to claim 12, further comprising an internal display, different from the external display, superposed on the handwritten information inputting device, wherein the internal display is configured to display the function disposition region including the operational elements.

14. The portable electronic apparatus according to claim 13, wherein the handwritten information inputting device is superposed relative to a front face, a rear face, or a side face of the internal display.

15. The portable electronic apparatus according to claim 13, wherein the internal display displays the operational elements as graphic icons.

16. The portable electronic apparatus according to claim 12, wherein the information processing device includes: (a) an image production circuit configured to produce an image based on the handwritten information inputted in the handwritten information inputting region and to produce the processed handwritten information based on activation of any of the operational elements disposed in the function disposition region, and (b) a wireless connection circuit configured to establish the wireless connection with the external display.

17. The portable electronic apparatus according to claim 16, wherein the information processing device further includes a wireless connection confirmation circuit configured to confirm whether it is possible to establish a wireless connection with the external display.

18. The portable electronic apparatus according to claim 17, wherein, if it is confirmed by the wireless connection confirmation circuit that it is possible to establish a wireless connection with the external display, the information processing device acquires information on a screen aspect ratio of the external display, and determines a first region on the external display which show the operational element disposition information relative to a second region on the external display which shows the inputted handwritten information.

* * * * *

UNITED STATES PATENT AND TRADEMARK OFFICE
CERTIFICATE OF CORRECTION

PATENT NO. : 9,880,734 B2
APPLICATION NO. : 14/716734
DATED : January 30, 2018
INVENTOR(S) : Joseph Sliger Page 1 of 1

It is certified that error appears in the above-identified patent and that said Letters Patent is hereby corrected as shown below:

On the Title Page

Item (56):
"JP 2363 789 A2 9/2011"
Should read:
-- EP 2363 789 A2 9/2011 --.

Signed and Sealed this
Eighth Day of May, 2018

Andrei Iancu
*Director of the United States Patent and Trademark Office*